United States Patent
Jeong et al.

(10) Patent No.: US 11,906,458 B2
(45) Date of Patent: Feb. 20, 2024

(54) ELECTRONIC DEVICE FOR DETECTING MOISTURE INFLOW AND METHOD FOR OPERATING SAME

(71) Applicant: Samsung Electronics Co., Ltd., Gyeonggi-do (KR)

(72) Inventors: Hoyoung Jeong, Gyeonggi-do (KR); Youngmin Kang, Gyeonggi-do (KR); Myunghoon Kwak, Gyeonggi-do (KR); Youngrog Kim, Gyeonggi-do (KR); Songyi Lee, Gyeonggi-do (KR); Jookwan Lee, Gyeonggi-do (KR); Jihyung Jung, Gyeonggi-do (KR); Baekeun Cho, Gyeonggi-do (KR); Soyoung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/519,757

(22) Filed: Nov. 5, 2021

(65) Prior Publication Data
US 2022/0146447 A1 May 12, 2022

Related U.S. Application Data

(63) Continuation of application No. PCT/KR2021/015917, filed on Nov. 4, 2021.

(30) Foreign Application Priority Data

Nov. 6, 2020 (KR) .......................... 10-2020-0148051

(51) Int. Cl.
*G01N 27/22* (2006.01)
*G06F 3/044* (2006.01)
(Continued)

(52) U.S. Cl.
CPC ......... *G01N 27/223* (2013.01); *G06F 1/1624* (2013.01); *G06F 1/1637* (2013.01);
(Continued)

(58) Field of Classification Search
CPC ... G01N 27/223; G06F 1/1624; G06F 1/1637; G06F 1/1692; G06F 3/044; G06F 9/4401;
(Continued)

(56) References Cited

U.S. PATENT DOCUMENTS

2012/0146924 A1   6/2012   Inoue
2013/0182360 A1   7/2013   Stevens et al.
(Continued)

FOREIGN PATENT DOCUMENTS

JP   2015-118089      6/2015
KR   1020120065233    6/2012
(Continued)

OTHER PUBLICATIONS

International Search Report dated Feb. 8, 2022 issued in counterpart application No. PCT/KR2021/015917, 10 pages.
(Continued)

Primary Examiner — Amit Chatly
(74) Attorney, Agent, or Firm — The Farrell Law Firm, P.C.

(57) ABSTRACT

An electronic device may include a housing, a display including a touch sensor panel, wherein the display is configured to move with respect to the housing so that at least one portion thereof is exposed from the inside of the housing to the front surface of the electronic device, and at least one processor operatively connected to the display. The at least one processor is configured to acquire, in a state in which at least one portion of the display is exposed to the front surface of the electronic device, data indicating a capacitance change on the at least one portion of the display
(Continued)

through the touch sensor panel, identify a moisture-introduced state, based on the acquired data, and perform an operation of responding to the identified moisture-introduced state.

13 Claims, 20 Drawing Sheets

(51) Int. Cl.
    *G06F 1/16*         (2006.01)
    *G06F 9/4401*     (2018.01)

(52) U.S. Cl.
    CPC ............ *G06F 1/1692* (2013.01); *G06F 3/044* (2013.01); *G06F 9/4401* (2013.01); *G06F 1/1616* (2013.01); *G06F 2203/04102* (2013.01)

(58) Field of Classification Search
    CPC ......... G06F 1/1616; G06F 2203/04102; G06F 1/1652; G06F 11/0742; G06F 11/0751; G06F 11/3013; G06F 11/3055
    See application file for complete search history.

(56) References Cited

U.S. PATENT DOCUMENTS

| | | |
|---|---|---|
| 2014/0141761 A1 | 5/2014 | Yun |
| 2014/0196254 A1 | 7/2014 | Song |
| 2014/0253150 A1 | 9/2014 | Menzel et al. |
| 2016/0211484 A1 | 7/2016 | Naijo |
| 2016/0239050 A1 | 8/2016 | Kim et al. |
| 2016/0336986 A1 | 11/2016 | Sakuma |
| 2016/0378224 A1 | 12/2016 | Kwon et al. |
| 2017/0011225 A1* | 1/2017 | Rakshit .................. G06F 21/86 |
| 2017/0269729 A1 | 9/2017 | Chintalapoodi |
| 2018/0275825 A1 | 9/2018 | Drake |
| 2018/0284047 A1* | 10/2018 | Kim ................... H04M 1/72454 |
| 2018/0374452 A1* | 12/2018 | Choi ....................... G06F 3/147 |
| 2019/0064998 A1* | 2/2019 | Chowdhury .......... G06F 1/1694 |
| 2019/0179448 A1 | 6/2019 | Lim et al. |
| 2021/0181137 A1 | 6/2021 | Chowdhury et al. |

FOREIGN PATENT DOCUMENTS

| | | |
|---|---|---|
| KR | 1020130082123 | 7/2013 |
| KR | 1020140065107 | 5/2014 |
| KR | 1020160088518 | 7/2016 |
| KR | 1020160099998 | 8/2016 |
| KR | 1020180047074 | 5/2018 |
| KR | 1020180109593 | 10/2018 |
| KR | 1020190071032 | 6/2019 |

OTHER PUBLICATIONS

European Search Report dated Dec. 1, 2023 issued in counterpart application No. 21889588.6-1224, 9 pages.

* cited by examiner

| Moisture detection table | Mutual-capacitance change | Self-capacitance change | State |
|---|---|---|---|
| | X | X | |
| | X | O | Hover |
| | O | X | Water |
| | O | O | Finger |

ELECTRONIC DEVICE FOR DETECTING MOISTURE INFLOW AND METHOD FOR OPERATING SAME

CROSS-REFERENCE TO RELATED APPLICATION(S)

This application is a Bypass Continuation Application of International Application No. PCT/KR2021/015917, which was filed on Nov. 4, 2021, and is based on and claims priority under 35 U.S.C. § 119 to Korean Patent Application No. 10-2020-0148051, which was filed in the Korean Intellectual Property Office on Nov. 6, 2020, the entire disclosure of each of which is incorporated herein by reference herein in its entirety.

BACKGROUND

1. Field

The disclosure relates generally to an electronic device for detecting a moisture inflow and a method for operating the same.

2. Description of Related Art

Various types of flexible electronic devices are being developed. Such flexible electronic devices may both provide larger displays and secure portability. For example, a user may apply a force to a flexible electronic device to change the shape thereof such that a foldable, bendable, or rollable display may be provided.

It may be more convenient to use an electronic device that outputs a larger screen for web surfing or multimedia functions. An electronic device may be equipped with a larger display to output a larger screen, but there may be restrictions in expanding the display size, in view of the portability of the electronic device. In an embodiment, a display using an organic light-emitting diode or the like may both provide a larger screen and secure the portability of the electronic device. For example, a display using an organic light-emitting diode (or an electronic device equipped therewith) may implement stable operations even if same is considerably thin, and may 30 thus be mounted on an electronic device in a foldable, bendable, slidable, or rollable type.

SUMMARY

In the case of an electronic device including a flexible display, the screen may be changed to an open or closed state by a movement of the structure that forms the electronic device, thereby changing the size of the display region.

However, in the case of an electronic device that is foldable, slidable, or rollable, foreign substances may flow into the inner space through the gap between the mechanical structures. For example, moisture or foreign substances may contaminate the inner space of a foldable, slidable, or rollable electronic device, thereby damaging various electronic components or mechanical components.

An aspect of the disclosure is to provide an electronic device including a flexible display and a method for operating the same, wherein an inflow of external moisture into the inner space can be sensed.

Another aspect of the disclosure is to provide an electronic device including a flexible display and a method for operating the same, wherein in response to a moisture sensing result, the state of moisture inflow may be indicated, or sliding operations may be limited.

According to an aspect of the disclosure, an electronic device includes a housing, a display including a touch sensor panel, wherein the display is configured to move with respect to the housing so that at least one portion thereof is exposed from an inside of the housing to a front surface of the electronic device, and at least one processor operatively connected to the display. The at least one processor is configured to acquire, in a state in which at least one portion of the display is exposed to the front surface of the electronic device, data indicating a capacitance change on the at least one portion of the display through the touch sensor panel, identify a moisture-introduced state, based on the acquired data, and perform an operation of responding to the identified moisture-introduced state.

According to another aspect of the disclosure, an method of an electronic device for sensing introduction of moisture includes acquiring, in a state in which at least one portion of a display of the electronic device is exposed from an inside of a housing of the electronic device to a front surface of the electronic device by moving with respect to the housing, data indicating a capacitance change on the at least one portion of the display through a touch sensor panel of the electronic device, identifying a moisture-introduced state, based on the acquired data, and performing an operation of responding to the identified moisture-introduced state.

According to an embodiment, an electronic device may sense an inflow of external moisture into the inner space thereof.

According to an embodiment, in response to the result of sensing moisture introduced therein, an electronic device may provide the user with a notification regarding the moisture-introduced state or limit sliding operations.

According to an embodiment, in response to sensing moisture, an electronic device may provide the user with a submersion guide or limit sliding operations, thereby preventing damage to the electronic device and to a flexible display due to submersion.

According to an embodiment, an electronic device may turn on a touch sensor panel for sensing moisture inflow in connection with a flexible display if an inflow of moisture into a connector is sensed, or if moisture is sensed in an always-on-touch (AOT) state such that the touch sensor panel does not necessarily remain turned on all the time, thereby reducing the amount of current consumed by the display.

Advantageous effects obtainable from the disclosure are not limited to the above-mentioned advantageous effects, and other advantageous effects will be clearly understood from the following description by those skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a table for moisture introduction sensing, according to an embodiment;

FIG. 7 illustrates a test result based on moisture introduction sensing, according to an embodiment;

DETAILED DESCRIPTION

Figure 1:
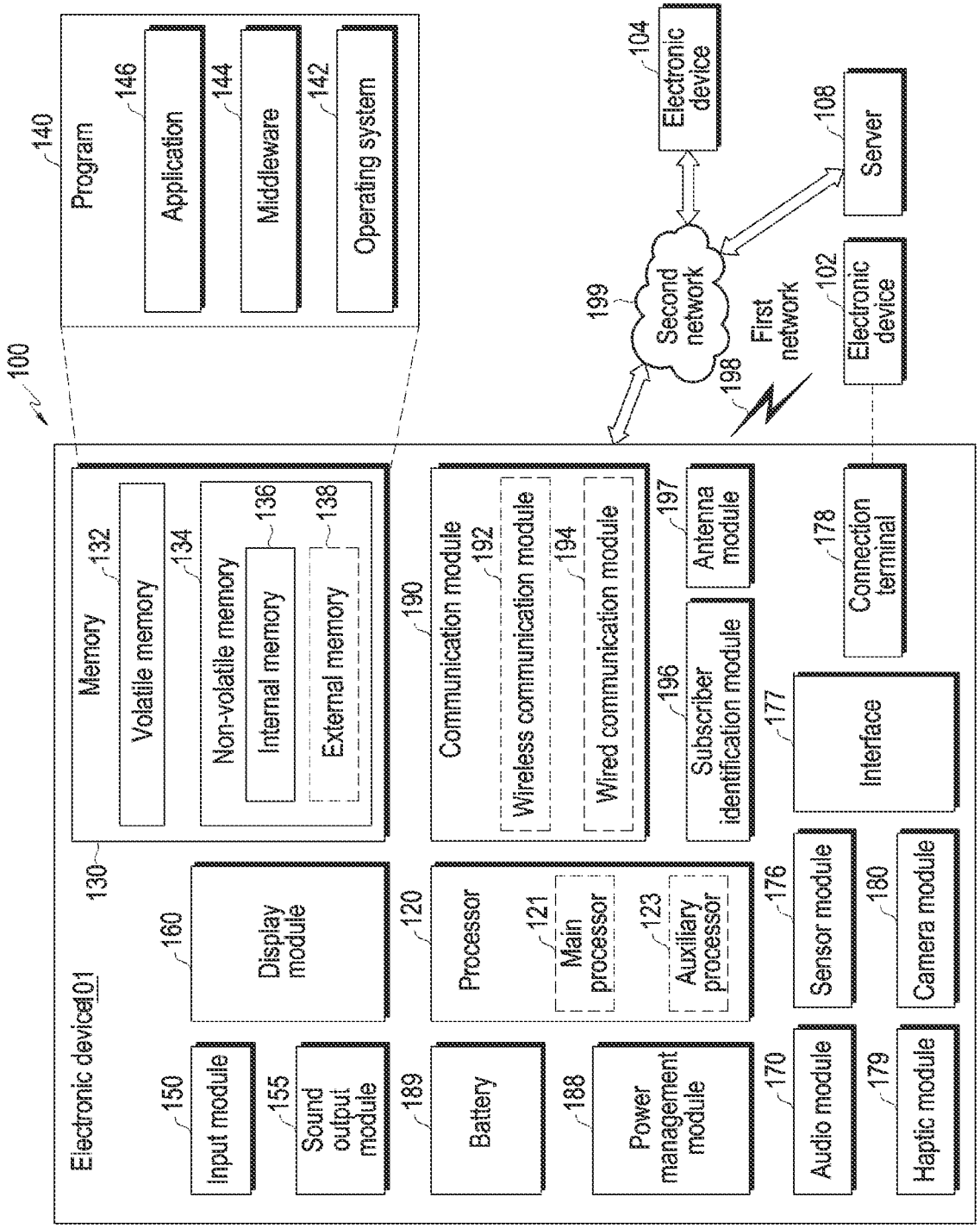
FIG. 1 illustrates an electronic device in a network environment, according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
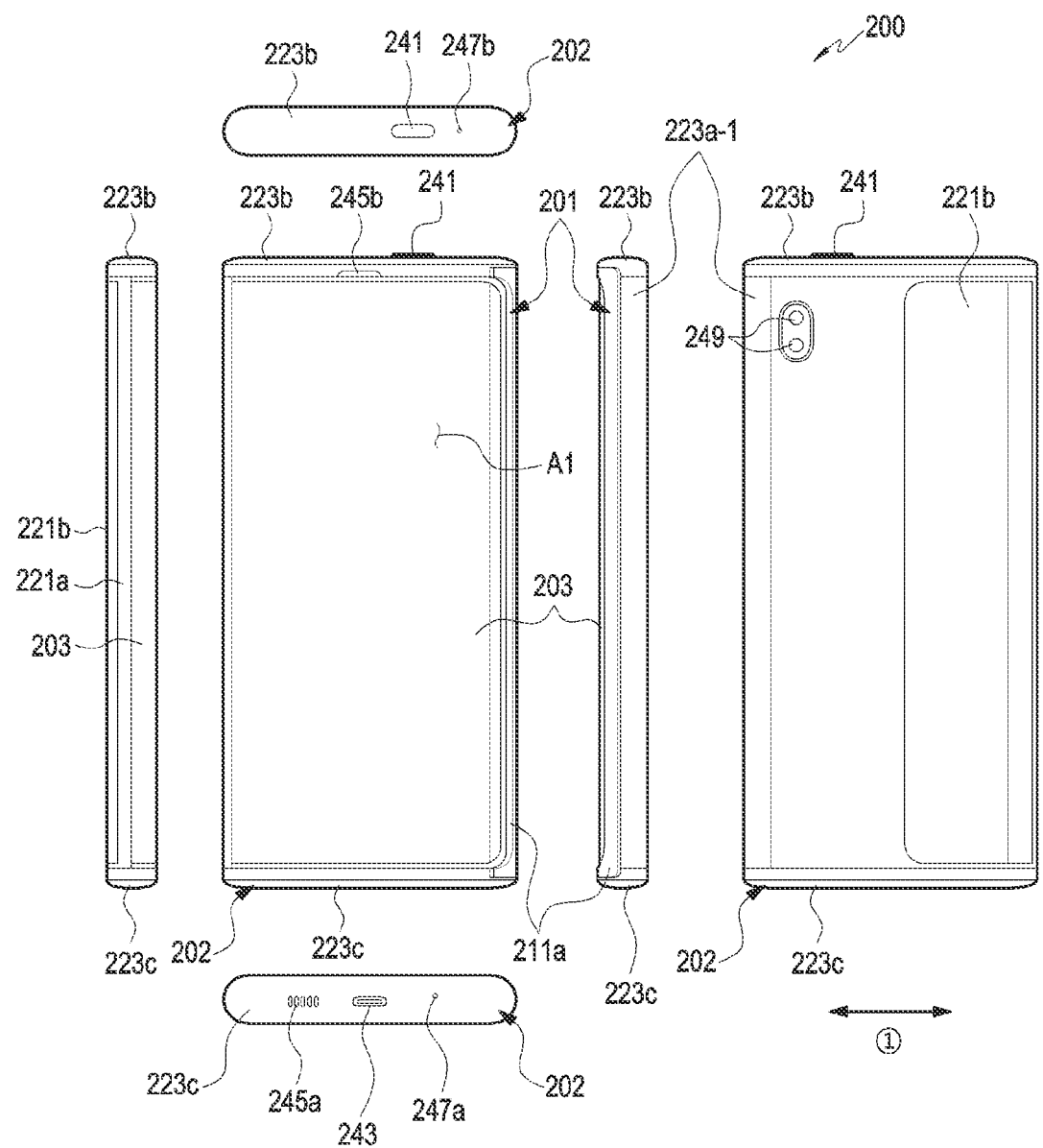
FIG. 2A illustrates an electronic device showing a state in which one portion of a flexible display is received in a second structure, according to an embodiment.
Figure 2B:
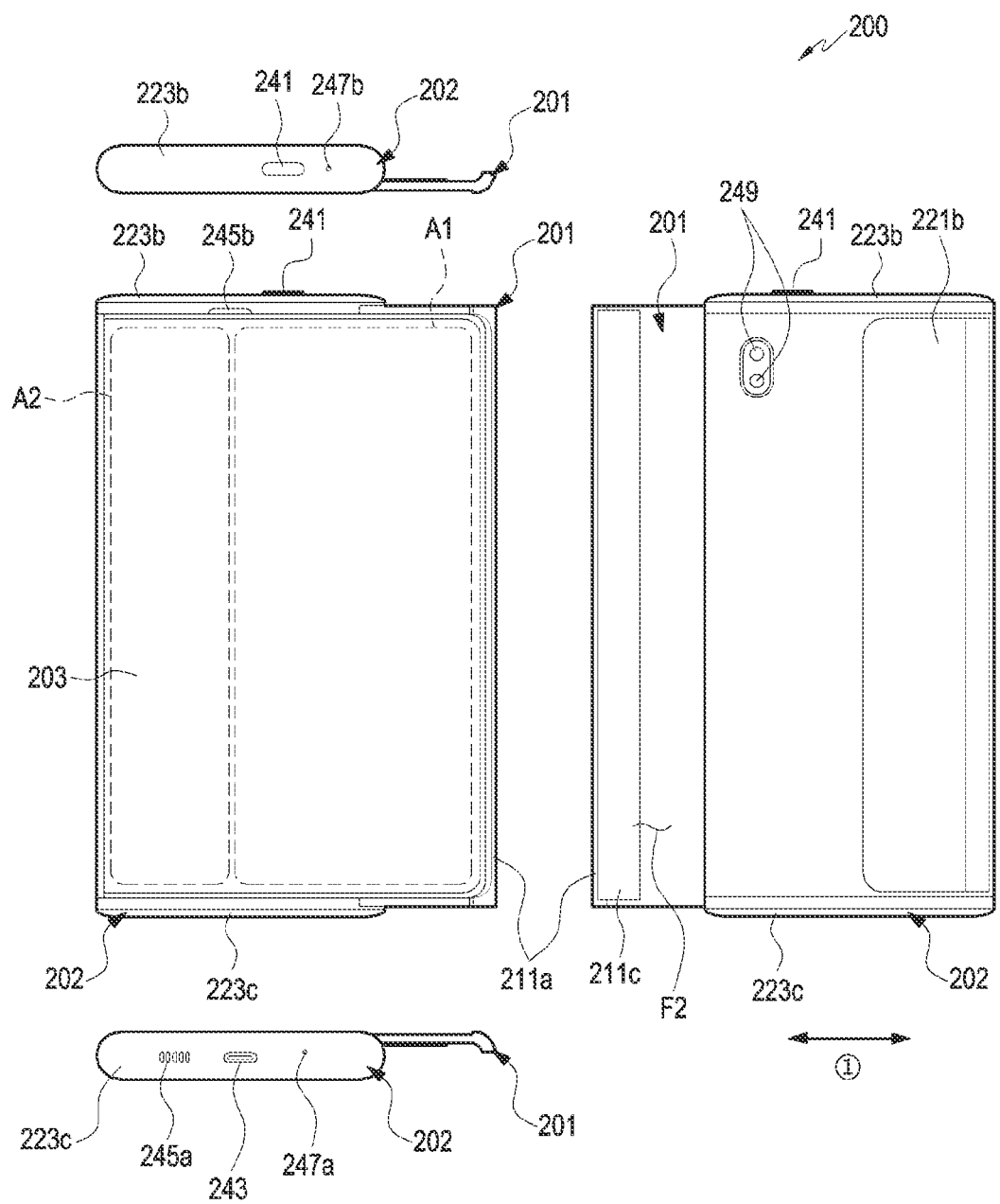
FIG. 2B illustrates an electronic device showing a state in which most of a flexible display is exposed out of a second structure, according to an embodiment.

FIG. 2A illustrates an electronic device 200 and is a view showing a state in which one portion (e.g., a second region A2) of a flexible display 203 is received in a second structure 202. FIG. 2B illustrates the electronic device 200 and is a view showing a state in which most of the flexible display 203 is exposed out of the second structure 202.

More specifically, FIG. 2A illustrates a state in which a first structure 201 is closed with respect to the second structure 202, and FIG. 2B illustrates a state in which the first structure 201 is open with respect to the second structure 202. "Closed state" or "opened state" may be defined as a state in which an electronic device is closed or opened.

Referring to FIGS. 2A and 2B, the electronic device 200 may include the first structure 201 and the second structure 202 disposed to be movable in the first structure 201. The electronic device 200 may have a structure in which the first structure 201 is disposed to be slidable on the second structure 202. The first structure 201 may be disposed so as to reciprocate a predetermined distance in an illustrated direction with reference to the second structure 202, e.g., in a direction indicated by arrow ①.

According to various embodiments, the first structure 201 may be called, for example, a first housing, a slider, or a slide housing, and may be disposed to be able to reciprocate on the second structure 202. In an embodiment, the second structure 202 may be called, for example, a second housing, a main part, or a main housing, and may receive various types of electric or electronic components such as a main circuit board or a battery. One portion (e.g., a first region A1) of the display 203 may be seated on the first structure 201. In an embodiment, as the first structure 201 moves (e.g., slides) with respect to the second structure 202, another portion (e.g., a second region A2) of the display 203 may be received in the second structure 202 (e.g., a slide-in operation), or may be exposed out of the second structure 202 (e.g., a slide-out operation).

According to various embodiments, the first structure 201 may include a first plate 211a (e.g., a slide plate), and a first surface F1 (see FIG. 2C, e.g., a front surface) formed to include at least one portion of the first plate 211a and a second surface F2 (e.g., a rear surface) facing in a direction opposite to that of the first surface F1. According to an embodiment, the second structure 202 may include a second plate 221a (see FIG. 2C) (e.g., a rear case), a first side wall 223a extending from the second plate 221a, a second side wall 223b extending from the first side wall 223a and the second plate 221a, a third side wall 223c extending from the first side wall 223a and the second plate 221a and parallel to the second side wall 223b, and/or a rear plate 221b (e.g., a rear window). In an embodiment, the second side wall 223b and the third side wall 223c may be formed perpendicular to the first side wall 223a. According to an embodiment, one side (e.g., a front surface) of each of the second plate 221a, the first side wall 223a, the second side wall 223b, and the third side wall 223c may be formed to be open such that each of the second plate 221a, the first side wall 223a, the second side wall 223b, and the third side wall 223c receive (or surround) at least a portion of the first structure 201. For example, the first structure 201 may be coupled to the second structure 202 while being at least partially surrounded by the second structure 202, and may slide in a direction parallel to the first surface F1 (e.g., the front surface) or the second surface F2 (e.g., the rear surface), for example, in a direction of arrow ① while being guided by the second structure 202.

According to various embodiments, the second side wall 223b or the third side wall 223c may be omitted. In addition, the second plate 221a, the first side wall 223a, the second side wall 223b and/or the third side wall 223c may be formed as separate structures, and may be coupled or assembled. The rear plate 221b may be coupled to the second plate 221a so as to surround at least a portion of the second plate 221a. In an embodiment, the rear plate 221b may be substantially formed integrally with the second plate 221a. According to an embodiment, the second plate 221a or the rear plate 221b may cover at least a portion of the flexible display 203. For example, the flexible display 203 may be at least partially received in the second structure 202, and the second plate 221a or the rear plate 221b may cover a portion of the flexible display 203 received in the second structure 202.

According to various embodiments, the first structure 201 can move in an opened state or a closed state with respect to the second structure 202 in a first direction (e.g., direction ①) parallel to the second plate 221a (e.g., the rear case) and the second side wall 223b, and may move such that the first structure 201 is placed at first distance from the first side wall 223a in the closed state and is placed at a second distance greater than the first distance from the first side wall 223a in the opened state. In an embodiment, in the closed state, the first structure 201 may be placed so as to surround one portion of the first side wall 223a.

According to various embodiments, the electronic device 200 may include a display 203, a key input device 241, a connector hole 243, audio modules 245a, 245b, 247a, and 247b, or a camera module 249. The electronic device 200 may further include an indicator (e.g., a light emitting diode device) or various types of sensor modules.

According to various embodiments, the display 203 may include a first region A1 and the second region A2. In an embodiment, the first region A1 may be disposed on the first surface F1 while substantially extending across at least a portion of the first surface F1. The second region A2 may extend from the first region A1, and, by sliding of the first structure 201, may be inserted into or received in the second structure 202 (e.g., a housing) or may be exposed out of the second structure 202. The second region A2 may be substantially moved while being guided by a roller 251 (see FIG. 2C) mounted to the second structure 202, and may be received in or exposed out of the second structure 202. For example, one portion of the second region A2 may be deformed into a curved shape at a position corresponding to the roller 251 while the first structure 201 slides.

According to various embodiments, when seen from above the first plate 211a (e.g., the slide plate), if the first structure 201 moves from the closed state to the opened state, the second region A2 may substantially form a flat surface together with the first region A1 while being gradually exposed out of the second structure 202. The display 203 may be coupled to or disposed adjacent to a touch sensing circuit (TSC), a pressure sensor capable of measuring the strength (pressure) of a touch, and/or a digitizer for detecting a magnetic field-type stylus pen. In an embodiment, the second region A2 may be at least partially received in the second structure 202, and in the state illustrated FIG. 2A (e.g., the closed state), a portion of the second region A2 may be exposed to the outside. In an embodiment, regardless of the closed state or the opened state, the exposed portion of the second region A2 may be placed on the roller 251, and the portion of the second region A2 may maintain a curved shape in a position corresponding to the roller 251.

The key input device 241 may be disposed on the second side wall 223b or the third side wall 223c of the second structure 202. The electronic device 200 may be configured such that depending on the exterior and the state of use, the illustrated key input device 241 may be omitted, or an additional key input device(s) may be included. In an embodiment, the electronic device 200 may include a key input device, such as a home key button or a touch pad disposed around the home key button. According to another embodiment, at least a portion of the key input device 241 may be positioned in one region of the first structure 201.

According to various embodiments, the connector hole 243 may be omitted, and may receive a connector (e.g., a USB connector) for transmitting or receiving power and/or data to or from an external electronic device. The electronic device 200 may include multiple connector holes 243, and some of the multiple connector holes 243 may function as connector holes for transmitting or receiving an audio signal to or from the external electronic device. In the illustrated embodiment, the connector hole 243 is disposed on the third side wall 223c, but the disclosure is not limited thereto. The connector hole 243 may be disposed on the first side wall 223a or the second side wall 223b.

According to various embodiments, the audio modules 245a, 245b, 247a, and 247b may include speaker holes 245a and 245b or microphone holes 247a and 247b. One of the speaker holes 245a and 245b may be provided as a receiver hole for a voice call, and the other speaker hole may be provided as an external speaker hole. A microphone for acquiring outside sounds may be disposed in each of the microphone holes 247a and 247b, and in an embodiment, multiple microphones may be disposed therein so as to sense the direction of a sound. In an embodiment, the speaker holes 245a and 245b and the microphone holes 247a and 247b may be implemented as a single hole, or a speaker (e.g., a piezo speaker) may be included without the speaker holes 245a and 245b. According to an embodiment, the speaker hole 245b may be disposed in the first structure 201 and used as a receiver hole for a voice call, and the speaker hole (e.g., an external speaker hole) 245a or the microphone holes 247a and 247b may be disposed in the second structure 202 (e.g., including one or more of side surfaces 223a, 223b, and 223c).

The camera module 249 may be provided in the second structure 202, and may capture an image of a subject in a direction opposite to that of the first region A1 of the display 203. The electronic device 200 may include multiple camera modules 249. For example, the electronic device 200 may include a wide-angle cameral, a telephoto camera, or a close-up camera, and may include an IR projector and/or an IR receiver so as to measure the distance to a subject. The camera module 249 may include one or multiple lenses, image sensors, and/or ISPs. The electronic device 200 may further include a camera module (e.g., a front-facing camera) for capturing an image of a subject in a direction opposite to that of the first region A1 of the display 203. For example, the front-facing camera may be disposed around the first region A1 or in a region in which the front-facing camera overlaps the display 203, and when the front-facing camera is disposed in the region in which the same overlaps the display 203, the front-facing camera may capture an image of a subject through the display 203.

According to various embodiments, the indicator of the electronic device 200 may be disposed in the first structure 201 or the second structure 202, and may include a light-emitting diode so as to provide state information of the electronic device 200 in the form of a visual signal. The sensor module of the electronic device 200 may generate an electrical signal or a data value corresponding to the operational state of the inside of the electronic device 200 or an external environment state. The sensor module may include, for example, a proximity sensor, a fingerprint sensor, or a biometric sensor (e.g., an iris/face recognition sensor or a heart rate monitor (HRM) sensor). In another embodiment, the sensor module may further include at least one of, for example, a gesture sensor, a gyro sensor, a barometric pressure sensor, a magnetic sensor, an acceleration sensor, a grip sensor, a color sensor, an IR sensor, a temperature sensor, a humidity sensor, or an illuminance sensor.

Figure 2C:
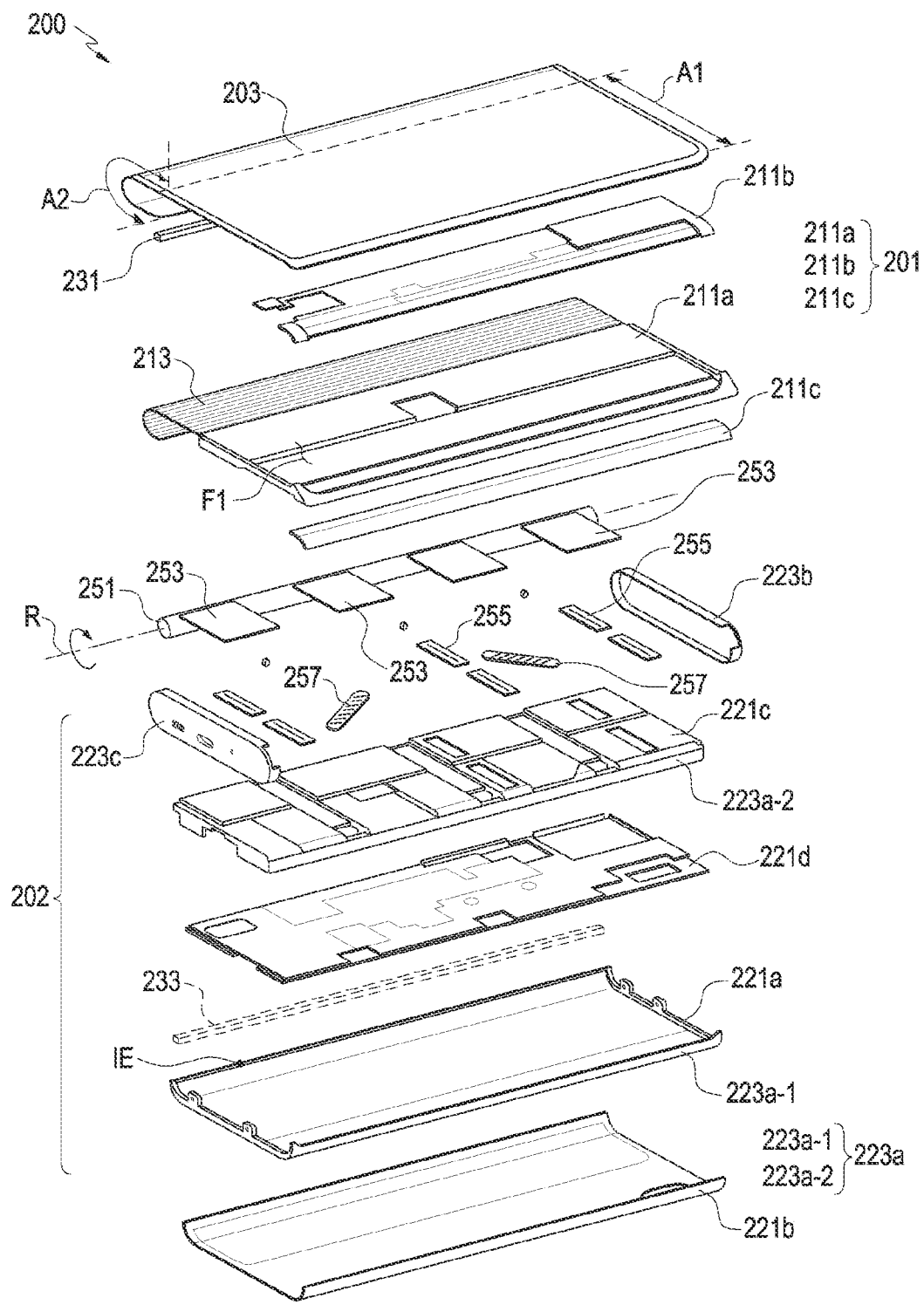
FIG. 2C is an exploded perspective view showing an electronic device, according to an embodiment.
Figure 2D:
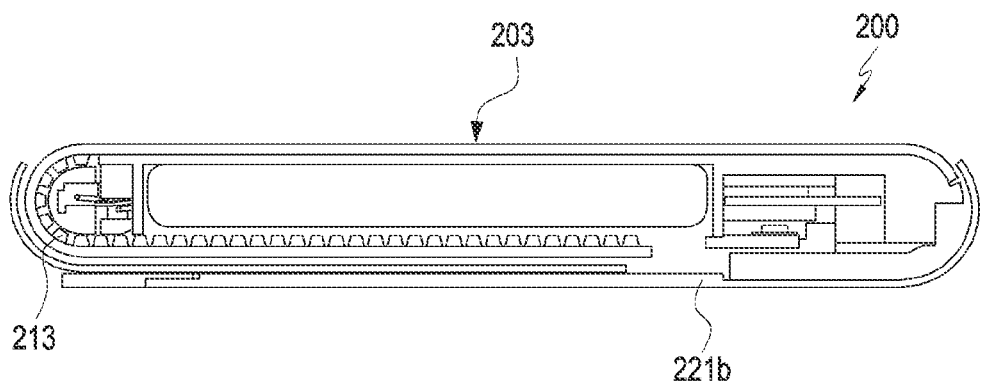
FIG. 2D is a side cross-sectional view showing an electronic device, according to an embodiment.

FIG. 2C is an exploded perspective view showing an electronic device 200, according to an embodiment. FIG. 2D is a side cross-sectional view showing an electronic device, according to an embodiment.

Referring to FIGS. 2C-2D, the electronic device 200 may include the first structure 201, the second structure 202 (e.g., the housing), the display 203 (e.g., the flexible display), a roller 251 (e.g., a guide member), a support sheet 253, and/or a multi-joint hinge structure 213. One portion (e.g., the second region A2) of the display 203 may be received in the second structure 202 while being guided by the roller 251.

According to various embodiments, the first structure 201 may include the first plate 211a (e.g., the slide plate), a first bracket 211b and/or a second bracket 211c, mounted on the first plate 211a. The first structure 201, for example, the first plate 211a, the first bracket 211b, and/or the second bracket 211c, may be formed of a metal material and/or a nonmetal (e.g., polymer) material. The first plate 211a may be mounted in the second structure 202 (e.g., the housing), and may be linearly reciprocated while being guided by the second structure 202 in one direction (e.g., a direction of arrow ① in FIGS. 2A-2B). In an embodiment, the first bracket 211b may be coupled to the first plate 211a to form a first surface F1 of the first structure 201 together with the first plate 211a. The first region A1 of the display 203 may be substantially mounted on the first surface F1 and maintained in a flat plate shape. The second bracket 211c may be coupled to the first plate 211a to form a second surface F2 of the first structure 201 together with the first plate 211a. According to an embodiment, the first bracket 211b and/or the second bracket 211c may be formed integrally with the first plate 211a. This design may take an assembling structure or a manufacturing process into consideration. The first structure 201 or the first plate 211a may be coupled to the second structure 202, and may slide with respect to the second structure 202.

According to various embodiments, the multi-joint hinge structure 213 may include multiple bars or rods, and may be connected to one end of the first structure 201. For example, as the first structure 201 slides, the multi-joint hinge structure 213 may move with respect to the second structure 202, in a closed state (e.g., the state illustrated in FIG. 2A), and may be substantially received in the second structure 202. In an embodiment, in the closed state, a portion of the multi-joint hinge structure 213 may not be received in the second structure 202. For example, in the closed state, a portion of the multi-joint hinge structure 213 may be positioned to correspond to the roller 251 outside the second structure 202. The multiple rods may be disposed parallel to a rotation axis R of the roller 251 while extending in a straight line, and may be arranged in a direction perpendicular to the rotation axis R, for example, in a direction in which the first structure 201 slides.

According to various embodiments, each rod 214 may rotate around another neighboring rod 214 while maintaining a state of being parallel with the other neighboring bar 214. Thus, as the first structure 201 slides, the multiple rods 214 may be arranged to form a curved shape or a flat surface shape. For example, as the first structure 201 slides, the multi-joint hinge structure 213 may form a curved surface at a portion facing the roller 251, and the multi-joint hinge structure 213 may form a flat surface at a portion which does not face the roller 251. In an embodiment, the second region A2 of the display 203 may be mounted on or supported by the multi-joint hinge structure 213, and may be exposed, together with the first region A1, out of the second structure 202 in an opened state (e.g., the state illustrated in FIG. 2B). In a state in which the second region A2 is exposed out of the second structure 202, the multi-joint hinge structure 213 may substantially form a flat surface, thereby supporting or maintaining the second region A2 in a flat state.

According to various embodiments, the second structure 202 (e.g., the housing) may include the second plate 221a (e.g., a rear case), a PCB, the rear plate 221b, a third plate 221c (e.g., a front case), and a support member 221d. The second plate 221a (e.g., the rear case), may be disposed to face a direction opposite to that of the first surface F1 of the first plate 211a, and may substantially provide the exterior shape of the second structure 202 or the electronic device 200. In an embodiment, the second structure 202 may include the first side wall 223a extending from the second plate 221a, the second side wall 223b extending from the second plate 221a and formed substantially perpendicular to the first side wall 223a, and the third side wall 223c which extends from the second plate 221a, is substantially perpendicular to the first side wall 223a, and is parallel to the second side wall 223b. In the illustrated embodiment, a structure in which the second side wall 223b and the third side wall 223c are manufactured as components are separated from the second plate 221a and are mounted or assembled to the second plate 221a. However, the second side wall 223b and the third side wall 223c may be formed integrally with the second plate 221a. The second structure 202 may receive, in a space which does not overlap the multi-joint hinge structure 213, a near field communication antenna, a wireless charging antenna, or a magnetic secure transmission (MST) antenna.

According to various embodiments, the rear plate 221b may be coupled to the outer surface of the second plate 221a, and may be integrally manufactured with the second plate 221a. In an embodiment, the second plate 221a may be manufactured using a metal or polymer material, and the rear plate 221b may be manufactured using a material, such as metal, glass, synthetic resin, or ceramic, thereby providing a decoration effect to the exterior of the electronic device 200. According to an embodiment, the second plate 221a and/or the rear plate 221b may be at least partially (e.g., at an auxiliary display region) manufactured using a material allowing light to pass therethrough. For example, in a state in which a portion (e.g., the second region A2) of the display 203 is received in the second structure 202, the electronic device 200 may output visual information by using the partial region of the display 203 received in the second structure 202. The auxiliary display region may provide the visual information output from the region received in the second structure 202 to the outside of the second structure 202.

According to various embodiments, the third plate 221c may be manufactured using a metal or polymer material, and may be coupled to the second plate 221a (e.g., the rear case), the first side wall 223a, the second side wall 223b, and/or the third side wall 223c, thereby forming an inner space of the second structure 202. According to an embodiment, the third plate 221c may be called a "front case", and the first structure 201, for example, the first plate 211a, may slide while substantially facing the third plate 221c. In an embodiment, the first side wall 223a may be formed by a combination of a first side wall part 223a-1 extending from the second plate 221a and a second side wall part 223a-2 formed at one-side edge of the third plate 221c. In another embodiment, the first side wall part 223a-1 may be coupled so as to surround the one-side edge of the third plate 221c, such as the second side wall part 223a-2. In this case, the first side wall part 223a-1 itself may form the first side wall 223a.

According to various embodiments, the support member 221d may be disposed in a space between the second plate 221a and the third plate 221c, and may have the shape of a flat plate manufactured using a metal or polymer material. The support member 221d may provide an electromagnetic shielding structure in the inner space of the second structure 202, or may enhance the mechanical rigidity of the second structure 202. In an embodiment, when received in the second structure 202, the multi-joint hinge structure 213 and/or a partial region (e.g., the second region A2) of the display 203 may be positioned in a space between the second plate 221a and the support member 221d.

According to various embodiments, the PCB may be disposed in a space between the third plate 221c and the support member 221d. For example, the PCB may be received in a space that is separated from the space, in which the multi-joint hinge structure 213 and/or a partial region of the display 203, by the support member 221d in the second structure 202. A processor, a memory, and/or an interface may be mounted on the PCB. The processor may include at least one among a CPU, an AP, a graphics processing device, an ISP, a sensor hub processor, or a CP.

The memory may include, for example, a volatile memory and/or a nonvolatile memory.

The interface may include an HDMI, a USB interface, an SD card interface, and/or an audio interface. The interface may electrically or physically connect the electronic device 200 to an external electronic device, and may include a USB connector, an SD card/MMC connector, or an audio connector.

According to various embodiments, the display 203 may be a flexible display based on an organic light-emitting diode, and may be at least partially deformed into a curved shape while maintaining a flat shape as a whole. In an embodiment, the first region A1 of the display 203 may be mounted or attached to the first surface F1 of the first structure 201, thereby maintaining a substantially flat shape. The second region A2 extends from the first region A1, and may be supported by or attached to the multi-joint hinge structure 213. For example, the second region A2 extends in a direction in which the first structure 201 slides, may be received in the second structure 202 together with the multi-joint hinge structure 213, and may be deformed to at least partially form a curved shape depending on the deformation of the multi-joint hinge structure 213.

According to various embodiments, the area of the display 203 exposed to the outside may vary depending on sliding of the first structure 201 on the second structure 202. The electronic device 200 (including the processor) may change an activation region of the display 203 on the basis of the area of the display 203 exposed to the outside. For example, in an opened state or in an intermediate state between the opened state and a closed state, the electronic device 200 may activate a region exposed to the outside of the second structure 202, among the entire area of the display 203. In the closed state, the electronic device 200 may activate the first region A1 of the display 203 and may deactivate the second region A2. In the closed state, if there is no user input for a predetermined time (e.g., 30 seconds or 2 minutes), the electronic device 200 may deactivate the entire region of the display 203. In an embodiment, in a state in which the entire region of the display 203 is deactivated, the electronic device 200 may activate a partial region of the display 203 according to necessity (e.g., notification according to user configuration or missed call/message arrival notification) to provide visual information through an auxiliary display region (e.g., one portion of the second plate 221a and/or the rear plate 221b manufactured using a light-transmitting material).

According to various embodiments, in the opened state (e.g., the state illustrated in FIG. 2B), the entire region (e.g., the first region A1 and the second region A2) of the display 203 may be substantially exposed to the outside, and the first region A1 and the second region A2 may be arranged to form a flat surface. In an embodiment, in the opened state, a portion (e.g., one end) of the second region A2 may be positioned to correspond to the roller 251, and the portion of the second region A2, corresponding to the roller 251, may be maintained in a curved shape. For example, even when it is described that "in the opened state, the second region A2 is disposed to form a flat surface", a portion of the second region A2 may be maintained in a curved shape. Similarly, even when it is described that "in the closed state, the multi-joint hinge structure 213 and/or the second region A2 are received in the second structure 202", the multi-joint hinge structure 213 and/or a portion of the second region A2 may be positioned outside the second structure 202.

According to various embodiments, the roller 251 (e.g., the guide member) may be rotatably mounted to the second structure 202 at a position adjacent to a one-side edge of the second structure 202 (e.g., the second plate 221a). The roller 251 may be disposed adjacent to an edge (e.g., a portion denoted by reference numeral "IE") of the second plate 221a that is parallel to the first side wall 223a. Another side wall may extend from an edge of the second plate 221a that is adjacent to the roller 251, and a side wall adjacent to the roller 251 may be substantially parallel to the first side wall 223a. The side wall of the second structure 202, adjacent to the roller 251, may be manufactured using a light-transmitting material, and a portion of the second region A2 may provide visual information through one portion of the second structure 202 while being received in the second structure 202.

According to various embodiments, one end of the roller 251 may be rotatably coupled to the second side wall 223b, and the other end thereof may be rotatably coupled to the third side wall 223c. For example, the roller 251 may be mounted to the second structure 202, and may rotate about a rotation axis R perpendicular to a sliding direction of the first structure 201 (e.g., the direction of arrow ① in FIG. 2A or 2B). The rotation axis R may be disposed substantially parallel to the first side wall 223a, and may be positioned away from the first side wall 223a and/or may be positioned at the one-side edge of the second plate 221a. In an embodiment, the gap formed between the outer circumferential surface of the roller 251 and the inner surface of an edge of the second plate 221a may form an entrance through which the multi-joint hinge structure 213 or the display 203 moves into the second structure 202.

According to various embodiments, when the display 203 is deformed into a curved shape, the roller 251 may maintain the curvature radius of the display 203 to a predetermined extent, thereby suppressing excessive deformation of the display 203. The "excessive deformation" may imply that the display 203 is deformed to have an excessively small curvature radius to such an extent that a pixel or a signal wire included in the display 203 is damaged. For example, the display 203 may be moved or deformed while being guided by the roller 251, and may be protected from a damage due to excessive deformation. In an embodiment, the roller 251 may rotate while the multi-joint hinge structure 213 or the display 203 is inserted into or drawn out of the second structure 202. For example, the multi-joint hinge structure 213 (or the display 203) may be smoothly inserted into/drawn out of the second structure 202 by suppressing friction between the multi-joint hinge structure 213 (or the display 203) and the second structure 202.

According to various embodiments, the support sheet 253 may be manufactured using a material having flexibility or a predetermined elasticity, such as a material including an elastic body such as silicone or rubber may be mounted or attached to the roller 251, and may be selectively wound around the roller 251 by rotation of the roller 251. In the illustrated embodiment, multiple (e.g., four) support sheets 253 are arranged in the direction of the rotation axis R of the roller 251. For example, each of the multiple support sheets 253 may be mounted to the roller 251 at predetermine intervals from another adjacent support sheet 253, and may extend in a direction perpendicular to the rotation axis R. In another embodiment, one support sheet may be mounted or attached to the roller 251. For example, the one support sheet may have a size and a shape which correspond to regions in which the support sheets 253 are disposed and regions between the support sheets 253 in FIG. 2C. Thus, the number, the size, or the shape of the support sheets 253 may be appropriately changed depending on an actually manufactured product. In an embodiment, when the roller 251 rotates, the support sheet 253 may be rolled on the outer circumferential surface of the roller 251, or may be unfolded in a flat plate shape between the display 203 and the third plate 221c while being apart from the roller 251. In another embodiment, the support sheet 253 may be called a "support belt", an "auxiliary belt", a "support film", or an "auxiliary film".

According to various embodiments, an end of the support sheet 253 may be connected to the first structure 201 (including the first plate 211a (e.g., the slide plate)), and the support sheet 253 may be rolled by the roller 251 in the closed state illustrated in FIG. 2A. Therefore, when the first plate 211a moves to an opened state illustrated in FIG. 2B, the support sheet 253 may be gradually positioned between the second structure 202 (including the third plate 221c) and the display 203 (including the second region A2) or between the second structure 202 (including the third plate 221c) and the multi-joint hinge structure 213. The support sheet 253 may be positioned such that at least one portion thereof faces the multi-joint hinge structure 213, and may be selectively wound around the roller 251 by the sliding of the first plate 211a. The support sheet 253 may be disposed so as to be wholly in contact with the multi-joint hinge structure 213, but a portion rolled by the roller 251 may be substantially separated from the multi-joint hinge structure 213.

According to various embodiments, the gap between the surface of the display 203 and the inner surface of an edge of the second plate 221a may vary depending on the extent that the support sheet 253 is wound on the roller 251. The narrower the gap is, the easier it is to prevent foreign matter from being introduced from the outside. However, when the gap is excessively narrow, the display 203 may come into contact or have friction with the second plate 221a. When direct contact or friction occurs, the surface of the display 203 may be damaged, or the sliding of the first structure 201 may be obstructed.

According to various embodiments, in the closed state, the support sheet 253 is wound on the roller 251, and thus the gap between the surface of the display 203 and the inner surface of the edge of the second plate 221a may be reduced while maintaining a state in which the surface of the display 203 is not in contact with the second plate 221a. For example, in the closed state, the gap may be reduced, thereby preventing foreign matter from being introduced into the second structure 202 from the outside. In an embodiment, as the first structure 201 (including the first plate 211a (e.g., the slide plate)) gradually moves to the opened state, the support sheet 253 may be apart from the roller 251 and gradually moves to the space between the second structure 202 (including the second plate 221a or the third plate 221c) and the multi-joint hinge structure 213. As the first structure 201 moves to the opened state, the gap may gradually widen to suppress direct friction or contact between the display 203 and another structure (e.g., the second plate 221a), thereby preventing the surface of the display 203 from being damaged due to the friction or the contact. In an embodiment, The thickness of the support sheet 253 may gradually increase from one end (e.g., a portion fixed to the roller 251) toward the other end (e.g., a portion fixed to the first plate 211a) thereof. The gap in the closed state and the opened state may be adjusted using the above thickness profile of the support sheet 253.

According to various embodiments, the electronic device 200 may include a low-density elastic body such as a sponge, or at least one elastic member 231 or 233 manufactured as a brush. For example, the electronic device 200 may include a first elastic member 231 mounted on one end of the display 203, and may further include a second elastic member 233 mounted on the inner surface of an edge of the second plate 221a. The first elastic member 231 may be substantially disposed in the inner space of the second structure 202, and, in the opened state illustrated in FIG. 2B, may be positioned to correspond to the edge of the second plate 221a. In an embodiment, the first elastic member 231 may move in the inner space of the second structure 202 according to sliding of the first structure 201. When the first structure 201 moves from the closed state to the opened state, the first elastic member 231 may move toward the edge of the second plate 221a. When the first structure 201 reaches the opened state, the first elastic member 231 may be brought into contact with the inner surface of the edge of the second plate 221a. For example, in the opened state, the first elastic member 231 may seal the gap between the inner surface of the edge of the second plate 221a and the surface of the display 203. In another embodiment, when the first structure 201 moves from the closed state to the opened state, the first elastic member 231 may move while being in contact with the second plate 221a (e.g., sliding contact). For example, if foreign matter has been introduced into the gap between the second region A2 and the second plate 221a in the closed state, the first elastic member 231 may discharge the foreign matter out of the second structure 202 at the time of movement to the opened state.

According to various embodiments, the second elastic member 233 may be attached to the inner surface of the edge of the second plate 221a, and may be disposed to substantially face the inner surface of the display 203. In the closed state, the gap between the surface of the display 203 and the inner surface of the edge of the second plate 221a may be substantially determined by the second elastic member 233. According to an embodiment, in the closed state, the second elastic member 233 may substantially seal the gap by coming into contact with the surface of the display 203. According to an embodiment, the second elastic member 233 may be manufactured as a brush or a low-density elastic body such as a sponge, and thus may not damage the surface of the display 203 even when coming into direct contact with the display 203. another embodiment, as the first structure 201 gradually moves to the opened state, the gap may become wider. For example, the display 203 may gradually expose the second region A2 out of the second structure 202 without substantial contact or friction with the second elastic member 233. When the first structure 201 reaches the opened state, the first elastic member 231 may be in contact with the second elastic member 233. For example, in the opened state, the first elastic member 231 and the second elastic member 233 may seal the gap, thereby preventing the introduction of foreign matter.

According to various embodiments, the electronic device 200 may further include a guide rail 255 (or guide rails) and/or an actuating member 257 (or actuating members). The guide rail 255 may be mounted on the second structure 202 (including the third plate 221c) so as to guide sliding of the first structure 201 (including the first plate 211a (e.g., the slide plate)). The actuating member 257 may include a spring or a spring module, which provides elastic force in a direction in which the opposite ends thereof move away from each other. One end of the actuating member 257 may be rotatably supported by the second structure 202, and the other end thereof may be rotatably supported by the first structure 201. When the first structure 201 slides, the opposite ends of the actuating member 257 are positioned closest to each other at one point between the closed state and the opened state (hereinafter, the "closest approach point"). For example, in the interval between the closest approach point and the closed state, the actuating member 257 may provide elastic force to the first structure 201 in a direction of movement toward the closed state, and in the interval between the closest approach point and the opened state, the actuating member 257 may provide elastic force to the first structure 201 in a direction of movement toward the opened state.

Figure 3A:
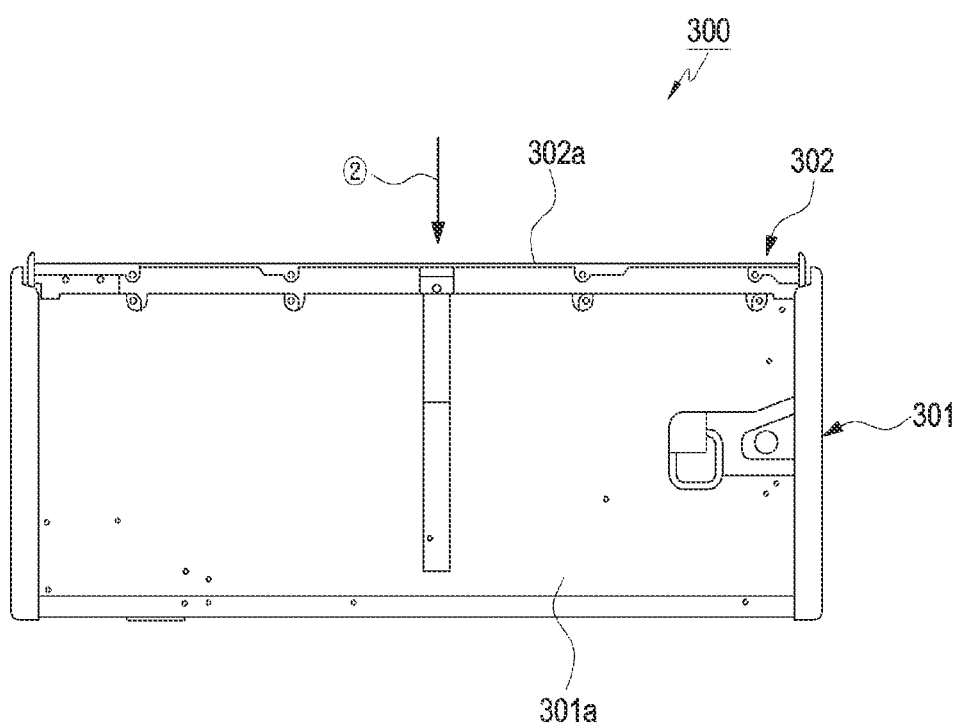
FIG. 3A is a plan view of an electronic device showing a state before automatic sliding of a second plate included in a second structure is caused by a driving motor, according to an embodiment.
Figure 3B:
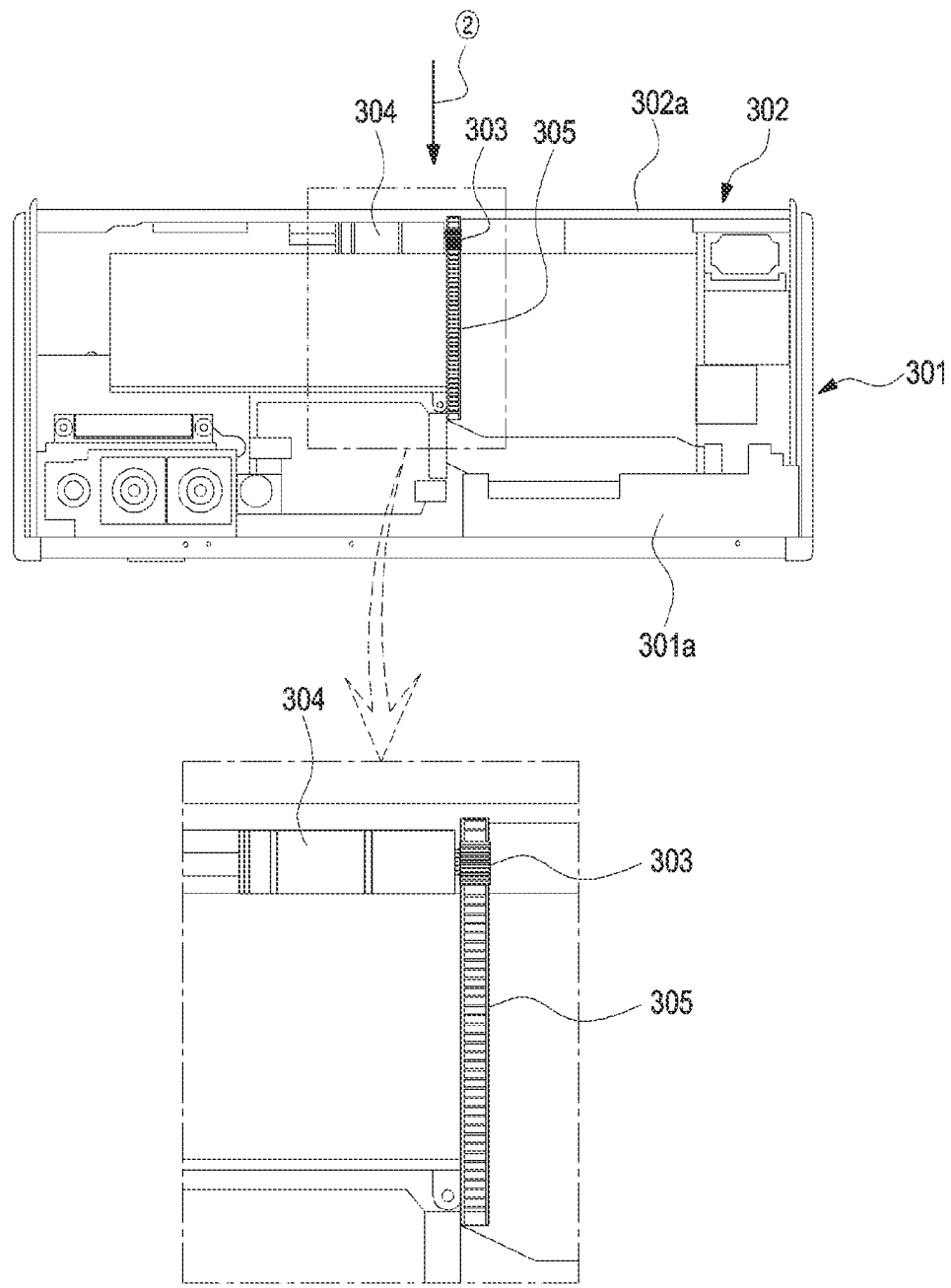
FIG. 3B is a bottom view of an electronic device showing a state before automatic sliding of a second plate included in a second structure is caused by a driving motor, according to an embodiment.
Figure 4A:
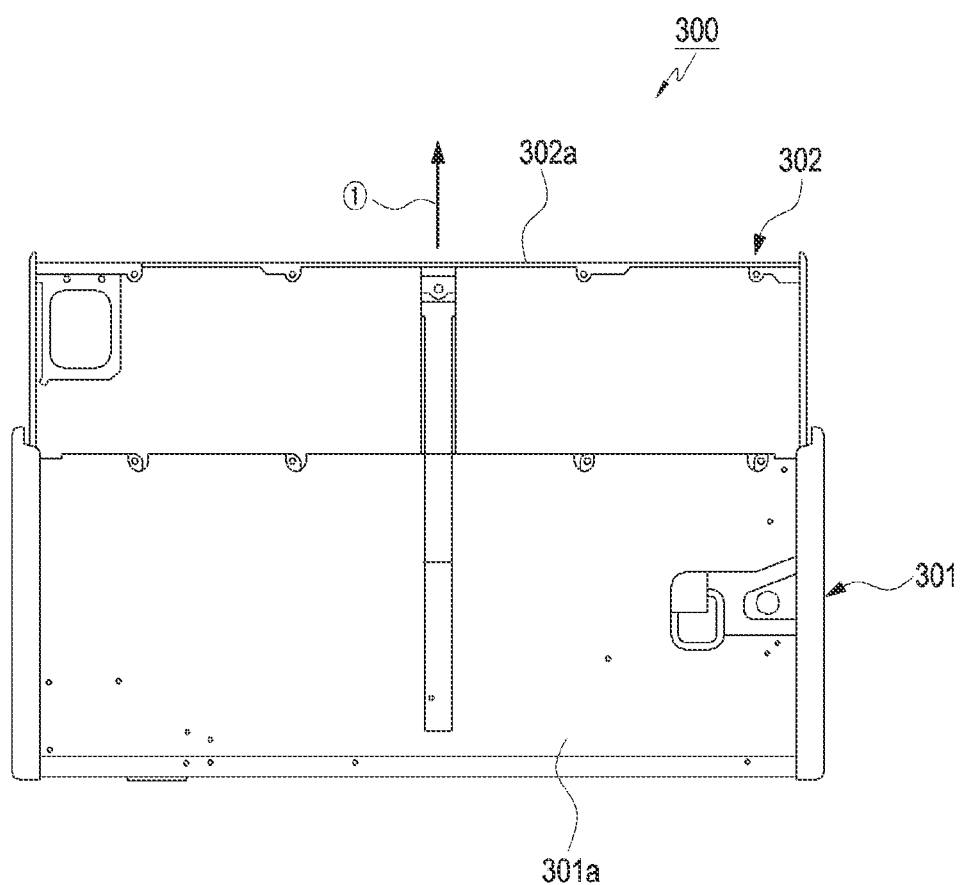
FIG. 4A is a plan view of an electronic device showing a state in which automatic sliding of a second plate included in a second structure is caused by a driving motor, according to an embodiment.
Figure 4B:
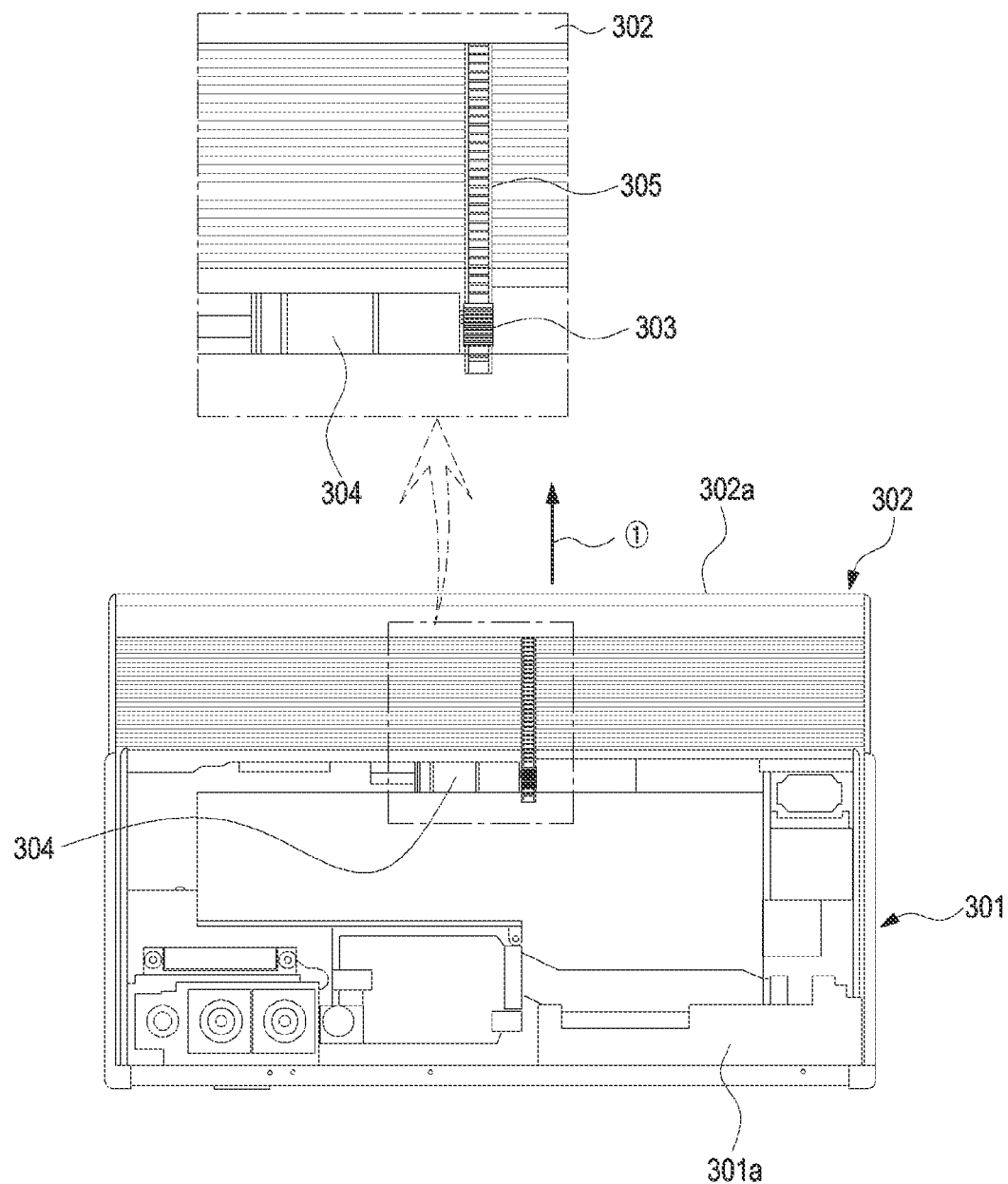
FIG. 4B illustrates a bottom view of an electronic device showing a state in which automatic sliding of a second plate included in a second structure is caused by a driving motor, according to an embodiment.

FIG. 3A illustrates a plan view of an electronic device 300 showing a state before automatic sliding of a second plate 302a included in a second structure 302 is caused by a driving motor 304, according to an embodiment. FIG. 3B illustrates a bottom view of the electronic device 300 showing a state before automatic sliding of the second plate 302a included in the second structure 302 is caused by the driving motor 304, according to an embodiment. FIG. 4A illustrates a plan view of the electronic device 300 showing a state in which automatic sliding of the second plate 302a of the second structure 302 is caused by the driving motor 304, according to an embodiment. FIG. 4B illustrates a bottom view of the electronic device 300 showing a state in which automatic sliding of the second plate 302a included in the second structure 302 is caused by the driving motor 304, according to an embodiment.

Referring to FIGS. 3A-3B and 4A-4B, the electronic device 300 may include first and second structures 301 and 302, a motor gear 303, a driving motor 304, a gear 305, an a processor (e.g., the processor 120 in FIG. 1). The motor gear 303 and the driving motor 304, described later, may be disposed in the first structure 301. The second structure 302 may slide according to driving of the driving motor 304 so as to be inserted into/drawn out of the first structure 301.

The motor gear 303 and the driving motor 304 may be disposed on the rear surface of the first plate 301a included in the first structure 301. The motor gear 303 may be provided at the driving motor 304, may mesh with the gear 305, described later, and may transfer driving of the driving motor 304 to the gear 305. The driving motor 304 may rotate the motor gear 303 while being driven.

The gear 305 may include a rack gear. For example, the gear 305 may be disposed on the rear surface of the second plate 302a included in the second structure 302, and may linearly move according to driving of the driving motor 304 to cause the second plate 302a of the second structure 302 to slide. For example, the gear 305 may change rotational movement of the driving motor 304 to linear movement. Therefore, the gear 305 may cause the second plate 302a to linearly slide.

The processor 120 may be disposed in the electronic device 300, and may control the driving of the driving motor 304 in order to cause the second plate 302a to slide.

According to various embodiments, as illustrated in FIGS. 4A and 4B, when a user exposes the entire region (e.g., the first region A1 and the second region A2) of a display (e.g., the display 203 in FIG. 2C) to the outside, for example, the user may touch at least one of an operation switch, an operation button, or the display 203, included in the electronic device 300, to apply an electrical signal to the processor, and the processor 120 may drive the driving motor 304 on the basis of the electrical signal. The driving motor 304 may rotate the motor gear 303 in the forward direction, and the motor gear 303 may linearly move the gear 305 through the rotation in the forward direction while causing the second plate 302a to slide in a first direction ① (e.g., the forward direction).

For example, the gear 305 may linearly slide by the rotation of the motor gear 303, and simultaneously may also cause the second plate 302a to slide in the first direction ①. At this time, the second plate 302a may be drawn from the first plate 301a.

For example, the second plate 302a may extend from the first plate 301a, in which case the display 203 may be enlarged. For example, the entire region (e.g., the first region A1 and the second region A2) of the display 203 may be exposed to the outside. Therefore, the entire region of the display 203 may be automatically exposed to the outside by driving of the driving motor 304, thereby making it easy to use the entire region (e.g., the first region A1 and the second region A2) of the display 203.

According to various embodiments, as illustrated in FIGS. 3A-3B, when the user exposes at least a partial region (e.g., the first region A1) of a display (reference numeral 203 in FIG. 2C), the user may touch at least one of an operation switch, an operation button, or the display 203, included in the electronic device, to apply an electrical signal to the processor 120, and the processor 120 may drive the driving motor 304 on the basis of the electrical signal. The driving motor 304 may rotate the motor gear 303 in the backward direction opposite to the forward direction, and the motor gear 303 may cause the gear 305 to slide in a second direction ② (e.g., the backward direction) opposite to the first direction ① (e.g., the forward direction) through the rotation in the backward direction.

For example, the gear 305 may slide by the rotation of the motor gear 303, and simultaneously may also cause the second plate 302*a* to slide in the second direction ② and return to the original position. The second plate 302*a* may be inserted into the first plate 301*a* again.

For example, the second plate 302*a* may return to the original position while sliding. The second plate 302*a* may reduce the display 203 while being inserted into the first plate 301*a*. At least a first partial region (e.g., the second region A2) of the display 203 may be closed, and at least a second partial region (e.g., the first region A1) of the display 203 may be exposed to the outside. Therefore, at least the first partial region (e.g., the second region A2) of the display 203 may be automatically closed from the outside by driving the driving motor.

According to various embodiments, the electronic device 300 may cause, based on the driving of the driving motor 304, the second plate 302*a* to slide and be drawn out of the first plate 301*a*, thereby automatically opening the entire region (e.g., the first region A1 and the second region A2) of the display 203. Further, the electronic device 300 may cause, based on the driving of the driving motor 304, the second plate 302*a* to slide and be inserted into the first plate 301*a*, thereby automatically closing at least a partial region (e.g., the second region A2) of the display 203. At this time, at least a partial region (e.g., the first region A1) of the display 203 may be exposed to the outside. Therefore, the electronic device 300 may more easily enlarge or reduce the display 203.

In the following detailed description, with respect to elements which can be easily understood through prior embodiments, reference numerals in the drawings may be identically given or may be omitted, and a detailed description thereof may also be omitted. An electronic device (e.g., the electronic device 300 in FIGS. 3A and 3B or 4A and 4B) according to various embodiments disclosed herein may be implemented by selectively combining elements in different embodiments, and an element in one embodiment may be replaced with an element in another embodiment. For example, it should be noted that the disclosure is not limited to a specific drawing or embodiment.

Figure 5:
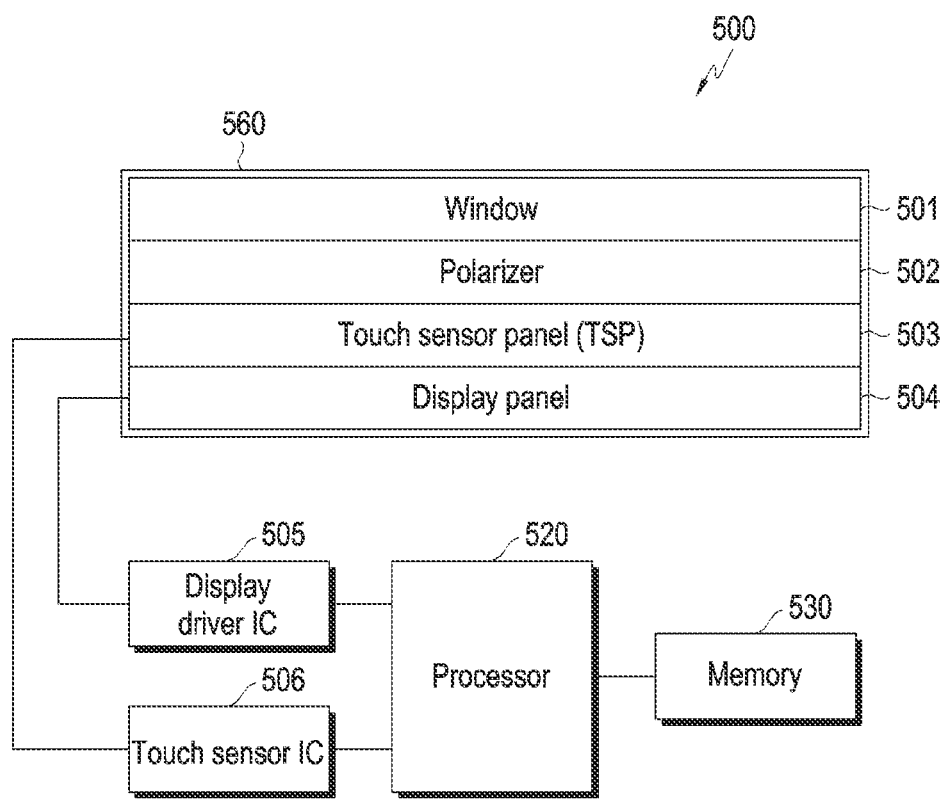
FIG. 5 is an internal block diagram of an electronic device, according to an embodiment.

FIG. 5 illustrates an electronic device, according to an embodiment.

Referring to FIG. 5, an electronic device 500 may include at least one processor 520, a memory 530, a display driver IC 505, and a touch sensor integrated circuit (IC) 506. Further, a flexible display 560 of the electronic device 500 may have the stacked structure illustrated in FIG. 5. According to an embodiment, the flexible display 560 may include a display panel 504, a touch sensor panel 503, and/or a window 501 disposed on a polarizer 502.

The touch sensor panel 503 is placed on the display panel 504, and an optical layer is disposed on the touch sensor panel 503. The optical layer may include the polarizer 502.

According to various embodiments, the touch sensor IC 506 may control the touch sensor panel 503 to measure, for example, a change in a signal (e.g., capacitance) for a specific position of the flexible display 560, thereby sensing a touch input or a hovering input at the specific position and providing, to the processor 520, information (e.g., a position, an area, pressure, or time) about the sensed touch input or hovering input.

According to various embodiments, the touch sensor IC 506 may sense the presence and absence of touch or hovering and/or touch coordinates on the basis of a change of capacitance (e.g., mutual-capacitance and/or self-capacitance) in an electrode of the touch sensor panel 503, and may transfer the same to the processor 520. According to an embodiment, the touch sensor IC 506 may sense a moisture-introduced state (or moisture infiltration) on the basis of the change of capacitance of an electrode of the touch sensor panel 503, and may transfer the same to the processor 520.

According to various embodiments, the display panel 504 may include an element for displaying a screen, and the window 501 may be formed of a transparent material. According to an embodiment, the window 501 may include a flexible window.

According to various embodiments, the display driver IC 505 is configured to control the flexible display 560, and may receive, from the processor 520, image information that includes image data or an image control signal corresponding to a command to control the image data.

According to various embodiments, the display driver IC 505 and the touch sensor IC 506 may also be integrally implemented.

According to various embodiments, the memory 530 may be electrically connected to the processor 520, and may store information about an operation of responding to the moisture-introduced state. For example, the information may include information for displaying a warning message in response to the amount of introduced moisture and information for limiting a sliding operation. Further, the memory 530 may store a program (or an application, an algorithm, or a processing loop) for calculating information (e.g., coordinate information and/or displacement information) about the position of an input means such as a finger or a stylus pen from data of the touch sensor panel 503.

According to various embodiments, when the touch sensor panel 503 is included, the electronic device 500 may sense a touch in a mutual-capacitance based touch sensing scheme which is a touch sensing scheme based on capacitance, or may sense a touch in a self-capacitance based touch sensing scheme.

In the case of the mutual-capacitance based touch sensing scheme, multiple touch electrodes (TEs) may be classified into a driving TE (transmission TE) to which a touch driving signal is applied and a sensing TE (reception TE) from which a touch sensing signal is detected and which forms capacitance with the driving TE.

In the case of the mutual-capacitance based touch sensing scheme, a TSC may sense the presence and absence of a touch and/or touch coordinates on the basis of a change in capacitance (mutual-capacitance) between the driving TE and the sensing touch electrode depending on the presence and absence of a pointer such as a finger or a stylus pen.

In the case of the self-capacitance based touch sensing scheme, each TE may function as both the driving touch electrode and the sensing touch electrode. For example, the TSC may apply a touch driving signal to at least one TE, may detect a touch sensing signal through the TE to which the touch driving signal has been applied, and may determine, based on the detected touch sensing signal, a change in capacitance between the TE and a pointer such as a finger or a stylus pen to sense the presence and absence of a touch and/or touch coordinates. In the self-capacitance based touch sensing scheme, the driving TE and the sensing TE may not be distinguished.

As described above, according to various embodiments, the electronic device 500 may sense a touch in the mutual-capacitance based touch sensing scheme, or may sense a touch in the self-capacitance based touch sensing scheme.

According to various embodiments, the processor 520 (e.g., the processor 120 in FIG. 1) may identify a moisture-introduced state by using a change in capacitance from an electrode of the touch sensor panel 503. According to an embodiment, the processor 520 may detect whether moisture is introduced, based on a change in a capacitance (mutual-capacitance and/or self-capacitance) in the electrode of the touch sensor panel 503.

According to an embodiment, the moisture-introduced state may be a state in which moisture introduced into an opening structure through which a display 203 of the electronic device 500 is inserted/drawn has been sensed, or a state in which there is moisture on the display 203 exposed to the outside. The introduction of moisture into the opening structure may be caused by a structure in which a first structure (the first structure 201 in the FIGS. 2A and 2B or the first structure 301 in FIGS. 3A, 3B, 4A, and 4B) of the electronic device 500 slides so as to be inserted or received in a second structure (e.g., the housing) (e.g., the second structure 202 in FIGS. 2A and 2B or the second structure 302 in FIGS. 3A, 3B, 4A, and 4B) or exposed out of the second structure.

According to various embodiments, the processor 520 may perform control so as to identify a moisture-introduced state and perform an operation of responding to the moisture-introduced state.

According to various embodiments, the area of the flexible display 560, which is exposed to the outside by a sliding operation, for example, exposed to the front surface of the electronic device 500, may change, but based on the amount of introduced moisture on a portion of the flexible display 560 exposed to the outside, the processor 520 may notify of the moisture-introduced state or may perform control to stop the sliding operation. Thus, the electronic device 500 including the flexible display 560 may be prevented from being damaged due to submersion into a liquid by providing a submersion guide to a user or limiting the sliding operation in response to sensing moisture in the electronic device 500.

According to an embodiment, the processor 520 may identify the amount of introduced moisture on the basis of an area, from which moisture has been detected, among the area (or the size of a region) of a portion of the flexible display 560 which is exposed to the outside. According to an embodiment, the portion of the flexible display 560, which is exposed to the outside, may indicate a portion exposed to the front surface of the electronic device 500. For example, in an opened state or an intermediate state between the opened state and a closed state, the sizes of portions, which are exposed to the outside, among the entire area of the flexible display 560 may be different from each other.

Thus, the processor 520 may determine the amount of introduced moisture on the basis of an area, from which an introduction of moisture is detected, among the area exposed to the outside. When the amount of introduced moisture is small (when a moisture area (or a moisture-introduced area) is smaller than a predetermined area), the processor 520 may display, for the user, information indicating that moisture has been introduced. On the other hand, when the amount of introduced moisture is large (when a moisture-introduced area is larger than the predetermined area), the processor 520 may stop a sliding operation which causes at least one portion of the flexible display 560 exposed to the outside to be internally inserted or received or which causes another portion extending from the at least one portion of the flexible display 560 to be exposed to the outside. In the state in which the introduction of moisture is sensed, even when a user input for a sliding operation is received, the processor 520 may ignore the user input. Thus, stopping the sliding operation in the state in which the introduction of moisture is sensed may prevent moisture from being introduced into the electronic device 500 due to the sliding operation.

According to various embodiments, the processor 520, when moisture introduced into a connector (e.g., the connection terminal 178 in FIG. 1 or the connector hole 243 in FIG. 2A) is sensed or when moisture is sensed through the touch sensor panel 503 in a low-power mode as in an AOT state, may activate the touch sensor panel 503 to identify a moisture-introduced state. For example, in the AOT state, when moisture is sensed through the touch sensor panel 503, the processor 520 may switch the touch sensor panel 503 to a normal power mode so as to more accurately identify a moisture-introduced state.

According to various embodiments, the processor 520 may sense moisture introduced into the connector, and, when the moisture introduced into the connector is sensed, may activate the touch sensor panel 503 into the normal power mode, thereby identifying a moisture-introduced state. According to various embodiments, the processor 520 may identify a more accurate moisture-introduced state by sensing the introduction of moisture by the result of sensing the moisture introduced into the connector and data indicating a change in capacitance of the touch sensor panel 503.

According to various embodiments, the processor 520 may support an AOT state in which a touch function of at least a partial region of the flexible display 560 is activated while the flexible display 560 is turned off. When moisture is sensed in the at least partial region in the AOT state, the processor 520 may switch the touch sensor panel 503 to the normal power mode to identify a moisture-introduced state. According to an embodiment, when moisture is sensed in a low-power mode as in the AOT state, the electronic device 500 may switch the touch sensor panel 503 (or the touch sensor IC 506) for sensing an introduction of moisture to a flexible display to the normal mode, and thus may not switch the touch sensor panel 503 (or the touch sensor IC 506) to the normal power mode at all times. Therefore, it is possible reduce power consumption by the display.

According to various embodiments, the processor 520 may limit an operation of a driving motor (e.g., the driving motor 304 in FIGS. 3A and 3B) in response to the moisture-introduced state, and may stop a sliding operation based on driving of the driving motor 304. Thus, when the moisture-introduced state is sensed, the processor 520 may limit the enlargement or reduction of the flexible display 560.

According to various embodiments, the electronic device 500 may include a housing (e.g., the second structure 202 in FIGS. 2A to 2D), a display (e.g., the display module 160 in FIG. 1, the display 203 in FIGS. 2A to 2D, and/or the flexible display 560 in FIG. 5) including the touch sensor panel 503 and moving with respect to the housing so that at least one portion thereof is exposed from the inside of the housing to the front surface of the electronic device 500, and at least one processor (e.g., the processor 120 in FIG. 1 and/or the processor 520 in FIG. 5) operatively connected to the touch sensor panel 503 and the display, wherein the at least one processor 520 is configured to acquire, in a state in which at least one portion of the display is exposed to the outside, data indicating a capacitance change on the at least one portion of the display through the touch sensor panel, identify a moisture-introduced state, based on the acquired data, and perform an operation of responding to the identified moisture-introduced state.

According to various embodiments, the at least one processor may be configured to identify a moisture area on the at least one portion of the display, based on the acquired data, and notify of the moisture-introduced state, based on the identified moisture area.

According to various embodiments, the display may move through rolling or sliding with respect to the housing so that at least one portion thereof is exposed from the inside of the housing to the front surface of the electronic device.

According to various embodiments, the at least one processor may be configured to stop a rolling or sliding operation which, in response to a case in which the moisture area is larger than or equal to a predetermined area, causes the at least one portion of the display to be inserted into the housing or causes another portion extending from the at least one portion of the display to be exposed out of the housing.

According to various embodiments, the at least one processor may be configured to identify a moisture area on the at least one portion while the rolling or sliding operation is stopped, and release the stopping of the rolling or sliding operation when the moisture area is smaller than the predetermined area.

According to various embodiments, the at least one processor may be configured to turn off power of the electronic device, in response to a case in which the moisture area is larger than or equal to the predetermined area.

According to various embodiments, the at least one processor may be configured to identify the moisture area before rebooting while the power of the electronic device is turned off, and complete the rebooting in response to a case in which the identified moisture area is smaller than the predetermined area.

According to various embodiments, the at least one processor may be configured to sense moisture introduced into a connector, and when the moisture introduced into the connector is sensed, identify the moisture-introduced state.

FIG. 6 is a table 600 for moisture introduction sensing, according to an embodiment.

Referring to FIG. 6, the electronic device 500 may use the touch sensor panel 503 to acquire data 610 indicating a change in mutual-capacitance, caused by an external object such as a finger or a stylus pen, on the flexible display 560 and data 620 indicating a change in self-capacitance. The electronic device 500 may identify, based at least on the data 610 and/or the data 620, an external object-related state 630 on the flexible display 560. For example, referring to the moisture detection table 600 illustrated in FIG. 6, when nothing is on the flexible display 560, there may be no change in both mutual-capacitance and self-capacitance. On the other hand, when there is no change in mutual-capacitance but there is a change in self-capacitance, the electronic device 500 may determine that the external object-related state is caused by hovering. Further, when there is a change in both mutual-capacitance and self-capacitance, the electronic device 500 may determine that the external object-related state is caused by a touch of a finger.

According to an embodiment, as indicated by reference numeral 640 in the drawing, the electronic device 500 may use the touch sensor panel 503 to determine that when there is a mutual-capacitance change but no a self-capacitance change on at least one portion of the flexible display 560, the external object-related state 630 is a state 640 caused by moisture that is different from an input means, based on the data characteristic. For example, the electronic device 500 may determine that a capacitance change is caused by moisture, based on data indicating each capacitance change on the at least one portion of the flexible display 560.

As described above, using mutual-capacitance data 610 and self-capacitance data 620 of the moisture detection table 600 illustrated in FIG. 6, the electronic device 500 may detect moisture on the at least one portion of the flexible display 560.

Figure 7:
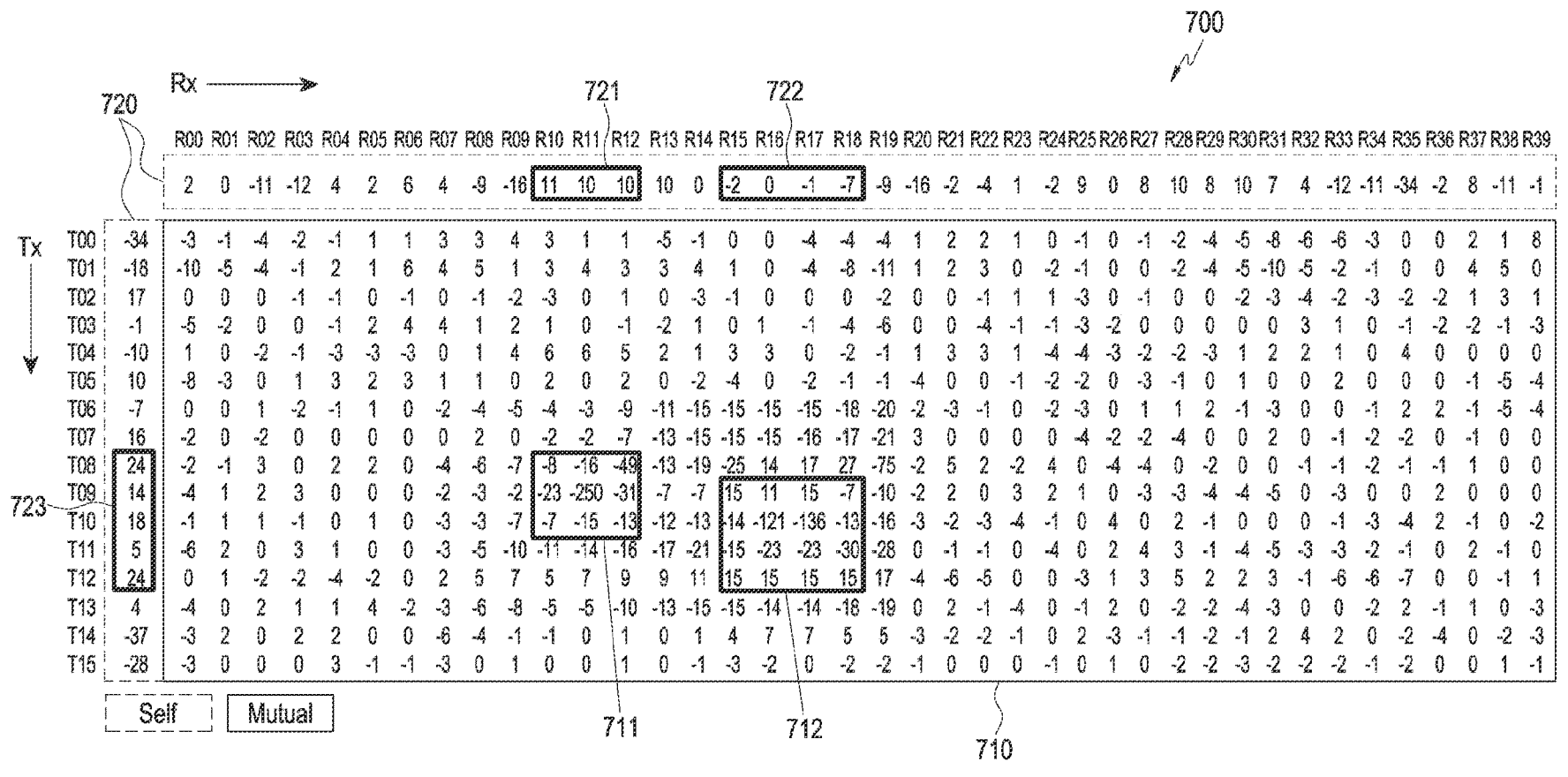

FIG. 7 is a view 700 illustrating a test result based on moisture introduction sensing, according to an embodiment.

FIG. 7 illustrates the distribution of data indicating a capacitance change on a display (e.g., the display module 160 in FIG. 1, the display 203 in FIGS. 2A to 2D, and/or the flexible display 560 in FIG. 5). Referring to FIG. 7, the top surface of the display 560 may be divided into multiple nodes. Each node may imply a unit calculated as a touch point or a hovering point.

According to an embodiment, the electronic device 500 may determine whether an external object is an input means or moisture, based on the distribution of data which is acquired by the touch sensor panel 503 and indicates a capacitance change caused by the external object on the flexible display 560, and may recognize the external object to be moisture instead of an input means. For example, as illustrated in FIG. 7, the data acquired by the touch sensor panel 503 may mainly include a portion 710 from which mutual-capacitance data is acquired, and a portion 720 from which self-capacitance data is acquired. For example, the electronic device 500 may use touch sensor panel 503 to acquire, while acquiring data distributions 711 and 712 in which there are many mutual-capacitance changes, data distributions 721, 722, and 723 in which there is little self-capacitance change of reception (Rx) and transmission (Tx) corresponding thereto.

The electronic device 500 may determine, based on the mutual-capacitance based data distributions 711 and 712 and the self-capacitance based data distributions 721, 722, and 723, that a capacitance change is caused by moisture on the flexible display 560, and may also identify the amount of introduced moisture according to areas indicating the data distributions. Thus, the electronic device 500 may determine nodes corresponding to a point in which moisture exists, based on the data distributions 711, 712, 721, 722, and 723, and may identify a moisture-introduced area on the basis thereof.

Figure 8:
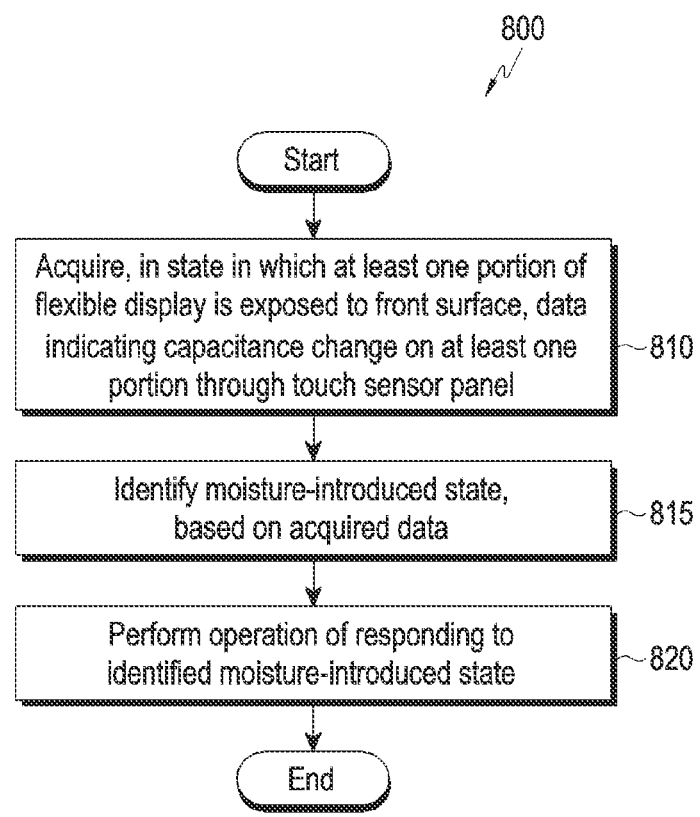
FIG. 8 is a flowchart of operations of an electronic device for moisture introduction sensing, according to an embodiment.

FIG. 8 is a flowchart 800 of operations of an electronic device for moisture introduction sensing, according to an embodiment.

Each step/operation of an operation method in FIG. 8 may be carried out by at least one of an electronic device (e.g., the electronic device 101 in FIG. 1, the electronic device 200 in FIGS. 2A to 2D, the electronic device 300 in FIGS. 3A to 4B, or the electronic device 500 in FIG. 5) including a flexible display (e.g., the display module 160 in FIG. 1, the display 203 in FIGS. 2A to 2D, and/or the flexible display 560 in FIG. 5) or at least one processor (e.g., the processor 120 in FIG. 1 and the processor 520 in FIG. 5) of the electronic device. At least one of operations 810 to 820 may be omitted, the ordering of some thereof may change, or another operation may be added.

Referring to FIG. 8, in operation 810, while at least one portion of the flexible display 560 of the electronic device 500 is exposed to the front surface of the electronic device 500, the electronic device 500 performs an operation of acquiring data indicating a capacitance change on the at least one portion through the touch sensor panel 503 of the electronic device 500.

According to an embodiment, at least one portion of the flexible display 560 may be exposed to the outside through a housing of the electronic device 500. A region of the flexible display 560, exposed to the outside (e.g., exposed to the front surface of the electronic device 500), or the exposed at least one portion of the flexible display 560 may be referred to as a first portion. In a first placement state (e.g., the closed state), the first portion of the flexible display 560 may include a first region (e.g., the first region A1 in FIG. 2A). According to an embodiment, in a second placement state (e.g., between the closed state and the opened state) of in the flexible display 560, the first portion of the display 560 exposed to the front surface of the electronic device 500 may include the first region A1 and one portion of a second region (e.g., the second region A2 in FIG. 2B) extending from the first region A1. According to an embodiment, in a third placement state (e.g., the completely opened state) of the flexible display 560, the first portion of the display 560 exposed to the outside may include both the first region A1 and the second region A2.

In operation 815, the electronic device 500 may perform, based on the acquired data, an operation of identifying a moisture-introduced state. According to an embodiment, the electronic device 500 may determine whether moisture is introduced, by using data indicating a capacitance change on the first portion of the touch sensor panel 503. According to an embodiment, when there is a mutual-capacitance change but no self-capacitance change in an electrode of the touch sensor panel 503, it may be determined, based on coordinates at which a mutual-capacitance change is made, that moisture has been introduced into the corresponding portion.

In operation 820, the electronic device 500 may perform an operation of responding to the identified moisture-introduced state. According to an embodiment, when it is sensed, based on the moisture-introduced state, that the amount of moisture is less than a predetermined amount, the electronic device 500 may display a guide indicating that the moisture should be removed, but when it is sensed that the amount of moisture is equal to or more than the predetermined amount, the electronic device 500 may limit a sliding operation. For example, in a state in which at least one portion of the flexible display 560 is exposed to the front surface, when a first user input for causing the at least one portion to be inserted or received in a housing (e.g., the second structure 202 in FIGS. 2A and 2B or the second structure 302 in FIGS. 3A, 3B, 4A, and 4B) or a second user input for causing another portion extending from the at least one portion to be exposed to the front surface are received, the electronic device 500 may ignore the first user input or the second user input. Alternatively, when it is sensed that the amount of moisture is greater than or equal to the predetermined amount, the electronic device 500 may automatically limit an operation of the driving motor for the sliding operation. On the contrary, when it is sensed that the amount of moisture is greater than or equal to the predetermined amount, the electronic device 500 may forcedly turn off power.

According to various embodiments, a method of an electronic device for sensing introduction of moisture may include acquiring, in a state in which at least one portion of a display of the electronic device is exposed from the inside of a housing of the electronic device to the front surface of the electronic device by moving with respect to the housing, data indicating a capacitance change on the at least one portion of the display through a touch sensor panel of the electronic device; identifying a moisture-introduced state, based on the acquired data; and performing an operation of responding to the identified moisture-introduced state.

According to various embodiments, the performing of the operation of responding to the identified moisture-introduced state may include identifying a moisture area on the at least one portion of the display, based on the acquired data, and notifying of the moisture-introduced state, based on the identified moisture area.

According to various embodiments, the state in which the at least one portion of the display is exposed to the front surface of the electronic device may be a state in which the at least one portion of the display is exposed from the inside of the housing to the front surface of the electronic device by moving through rolling or sliding with respect to the housing.

According to various embodiments, the performing of the operation of responding to the identified moisture-introduced state may include stopping a rolling or sliding operation which, in response to a case in which the moisture area is larger than or equal to a predetermined area, causes the at least one portion of the display to be inserted into the housing or causes another portion extending from the at least one portion of the display to be exposed out of the housing of the electronic device.

According to various embodiments, the method may further include identifying a moisture area on the at least one portion of the display while the rolling or sliding operation is stopped; and releasing the stopping of the rolling or sliding operation when the moisture area is smaller than the predetermined area.

According to various embodiments, the method may further include turning off power of the electronic device when the moisture area is larger than or equal to the predetermined area.

According to various embodiments, the method may further include sensing moisture introduced into a connector, and identifying the moisture-introduced state when the moisture introduced into the connector is sensed.

Figure 9A:
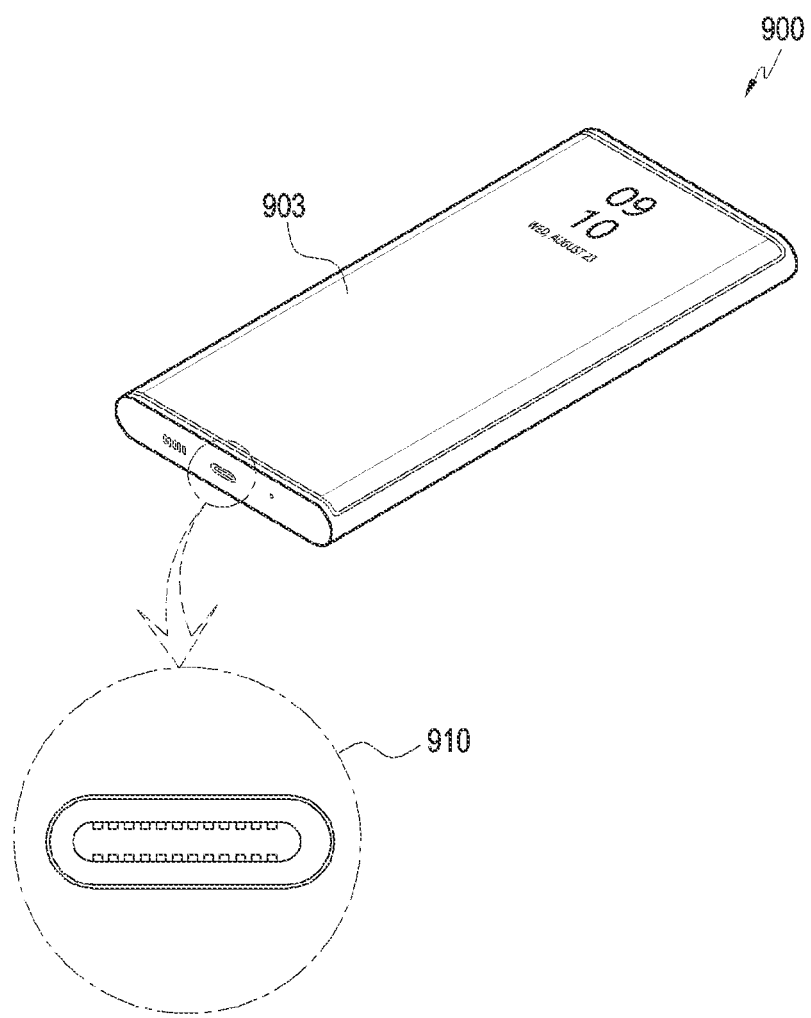
FIG. 9A illustrates an interface of an electronic device, according to an embodiment.

FIG. 9A illustrates an interface of an electronic device, according to an embodiment.

Referring to FIG. 9A, an electronic device 900 may include an opening formed in one surface of a housing thereof, a connector hole (e.g., the connector hole 243 in FIG. 2A) connected to the opening, and a connector 910 may be disposed in the hole. As illustrated in FIG. 9A, the opening and the hole may be formed in one surface of the lower side of the housing of the electronic device 900, and the connector 910 may be disposed therein. However, the placement position of the connector 910 is not limited thereto, and the connector 910 may be disposed on another surface of the housing of the electronic device 900.

According to an embodiment, due to the above-described opening portion structure, moisture may be introduced into the connector 910, and may determine a start event on the basis of detection of the introduction of moisture into the connector 910. Thus, when moisture is introduced into the connector 910, the electronic device 900 may start an operation of sensing whether there is moisture on the flexible display 903.

According to an embodiment, when the flexible display 903 is turned off but is in an AOT state, a touch function of at least a partial region of the flexible display 903 is in an activated state, and thus the electronic device 900 may sense moisture on the basis of a capacitance change in the at least partial region. Thus, a start event may be determined based on sensing of moisture in the at least partial region. The electronic device 900 may switch a touch sensor IC (e.g., the touch sensor IC 506 in FIG. 5) to a normal power mode on the basis of the start event, thereby starting an operation of sensing whether there is moisture on the flexible display 903.

The above-described start event for sensing whether there is moisture on the flexible display 903 may include, for example, detection of introduction of moisture into the connector 910, detection of moisture in the AOT state, or moisture detection in a low-power mode, but the type of start event is not limited thereto.

Figure 9B:
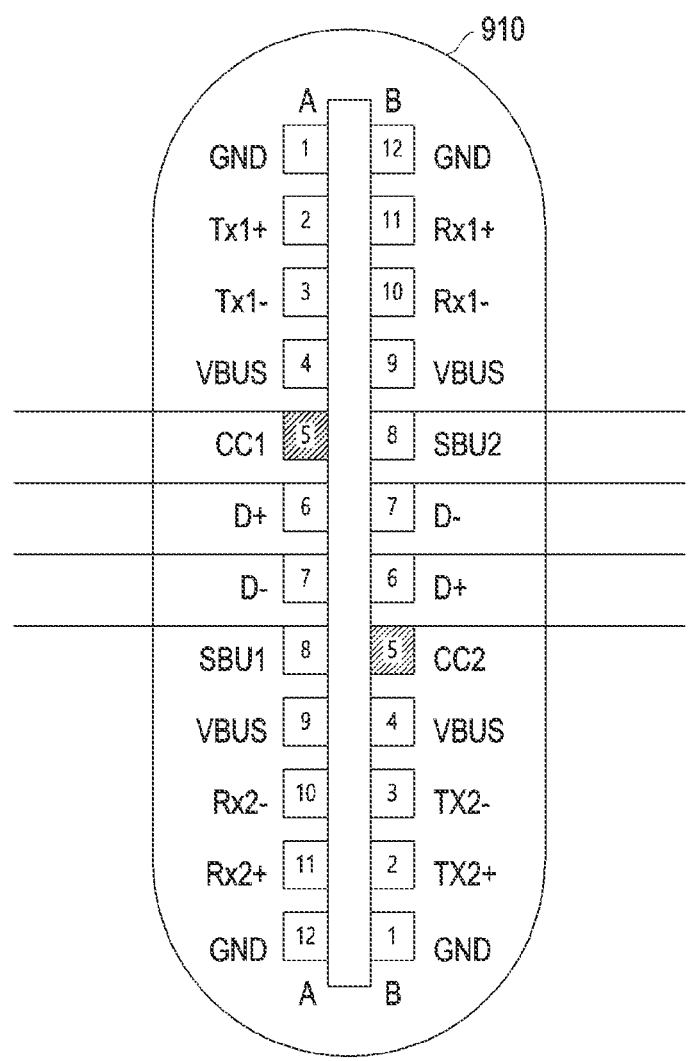
FIG. 9B illustrates a pin structure of a connector of an electronic device, according to an embodiment.

FIG. 9B illustrates a pin structure of a connector of an electronic device, according to an embodiment.

According to various embodiments, FIG. 9B illustrates multiple terminals which the connector 910 of an electronic device (e.g., the electronic device 101 in FIG. 1, the electronic device 200 in FIGS. 2A to 2D, the electronic device 300 in FIGS. 3A to 4B, or the electronic device 500 in FIG. 5) can include when the connector 910 complies with the USB type-C specification.

As illustrated in FIG. 9B, the connector 910 of the USB type-C specification may have 12 terminals in each of a left A line and a right B line, and the terminals may be symmetrical to each other. The role of each terminal is defined by the USB type-C standard, and thus a description of the role of each terminal will be omitted. According to an embodiment, the electronic device 500 may sense moisture on the basis of a CC1 terminal and CC2 terminal of the connector 910. For example, the electronic device 500 may determine a resistance value corresponding to moisture to sense introduction of moisture.

According to various embodiments, the electronic device 500 may regard sensing of introduction of moisture into the connector 910 as a start event for sensing whether there is moisture on the flexible display 560. According to an embodiment, when the introduction of moisture into the connector 910 is sensed, the electronic device 500 may switch the touch sensor panel 503 (or the touch sensor IC 506) for sensing introduction of moisture to the flexible display to a normal power mode, and may identify the amount of introduced moisture from data of the touch sensor panel 503. For example, when the introduction of moisture into the connector 910 is sensed, the possibility that there is also moisture in another portion of the electronic device 500 is high, and thus the touch sensor IC 506 may switch from a low-power mode to a normal power mode.

Figure 10:
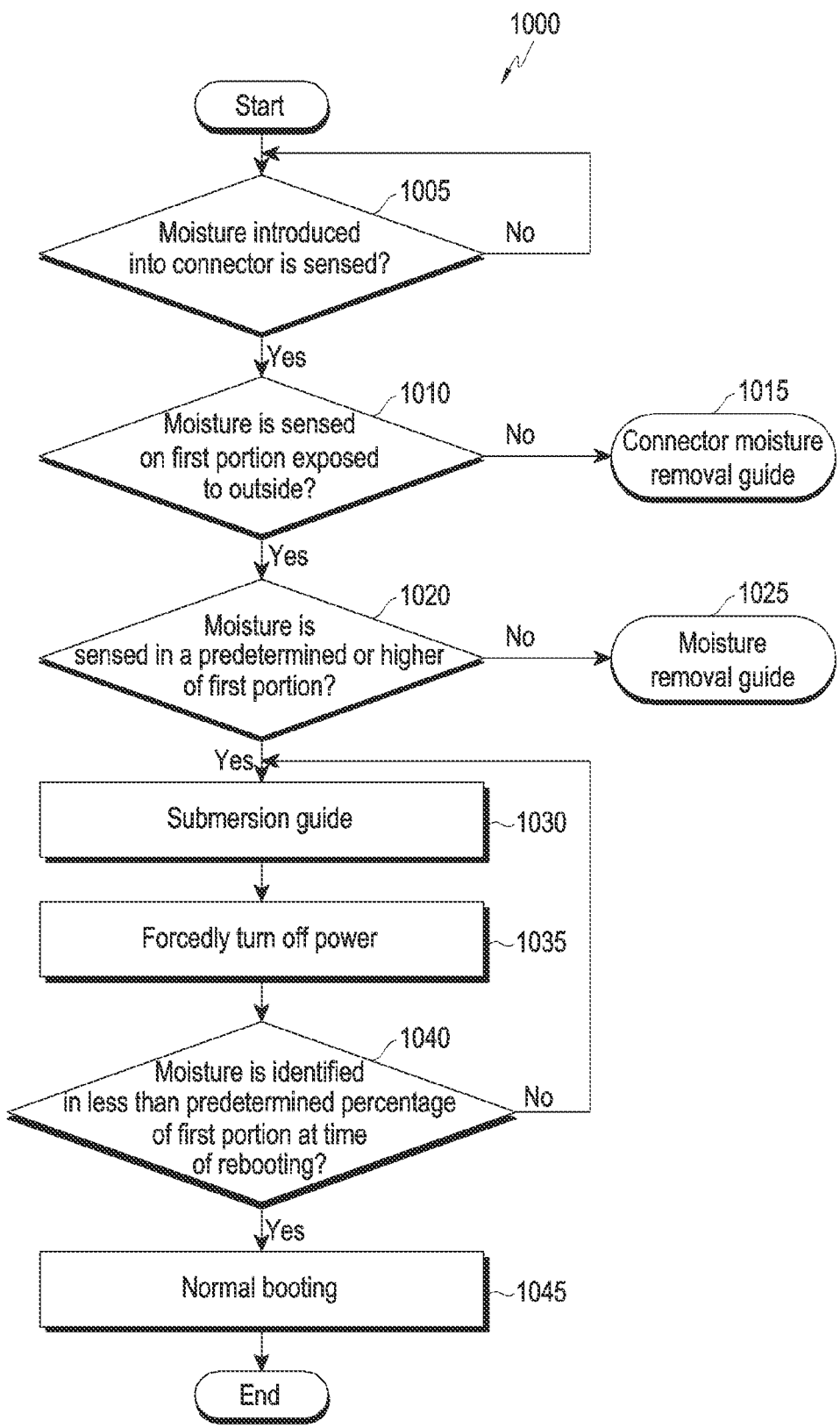
FIG. 10 is a flowchart of operations of an electronic device at the time of moisture sensing through a connector, according to an embodiment.

FIG. 10 is a flowchart 1000 of operations of an electronic device at the time of moisture sensing through a connector, according to an embodiment.

FIG. 10 illustrates operations of the electronic device 900 performed when moisture sensing through the connector serves as a trigger and is recognized as a start event for sensing moisture on the flexible display 903.

Referring to FIG. 10, when moisture introduced into a connector (e.g., the connection terminal 178 in FIG. 1 or the connector hole 243 in FIG. 2A) is sensed in operation 1005, the electronic device 900 may determine, in operation 1010, whether moisture is sensed on a first portion of the flexible display 903, exposed to the outside (e.g., exposed to the front surface of the electronic device 900). According to an embodiment, the electronic device 900 may sense moisture introduced into the connector, and when the moisture introduced into the connector is sensed, may activate the touch sensor panel 503 to determine whether there is moisture on the first portion. According to an embodiment, the size of the first portion of the flexible display 903, exposed to the front surface of the electronic device 900, may vary depending on the placement state. For example, in a first placement state (e.g., the closed state), the first portion of the flexible display 903 may include a first region (e.g., the first region A1 in FIG. 2A). In a second placement state (e.g., between the closed state and the opened state), the first portion of the flexible display 903 may include the first region A1 and one portion of a second region (e.g., the second region A2 in FIG. 2B) extending from the first region A1. In a third placement state (e.g., the completely opened state), the first portion of the flexible display 903 may include both the first region A1 and the second region A2.

If moisture is not sensed on the first portion, moisture has been introduced into only the connector, and thus the electronic device 900 may output a connector moisture removal guide in operation 1015. For example, the electronic device 900 may output a message or a notification sound, which warns that moisture is introduced into the connector and thus the electronic device 900 may be damaged.

However, when moisture is sensed on the first portion in operation 1010, the electronic device 900 may determine, in operation 1020, whether moisture is sensed on a predetermined percentage or higher of the first portion. For example, the electronic device 900 may determine, based on data distribution of the touch sensor panel 503, the amount of introduced moisture, in addition to the first portion, for example, a region in which moisture is sensed.

If moisture is not sensed on a predetermined percentage or higher of the first portion in operation 1020, the electronic device 900 may output a guide for moisture removal in operation 1025. For example, the electronic device 900 may output a guide including information warning that moisture exists on the flexible display 903 of the electronic device 900 and may thus be introduced into the electronic device 900 or requesting a user to remove the moisture.

However, when moisture is sensed on a predetermined percentage (e.g., 50%) or higher of the first portion in operation 1020, for example, when moisture is introduced to a predetermined percentage (e.g., 50%) or higher of the first portion, the amount of introduced moisture may be determined to be a lot, and thus a moisture-detected state due to submersion into a liquid may be determined. Thus, the electronic device 900 may output a submersion guide according to submersion in operation 1030, and may forcedly turn off power in operation 1035 in order to prevent damage to the electronic device 900 due to the submersion. For example, the submersion guide may include a content indicating that power will be forcedly turned off in order to prevent damage to the electronic device 900 when it is determined that the electronic device 900 has been submerged. Whether the introduced moisture has been removed may be determined before rebooting in a state in which the power of the electronic device is turned off. For example, after the power is forcedly turned off, a timer configured for rebooting is driven, and, when a rebooting time point comes based on the configured timer, the electronic device may determine whether moisture on the first portion has been removed.

If the moisture has been removed, the electronic device 900 may complete rebooting by being normally booted in operation 1045. For example, when moisture is removed in less than a predetermined percentage (e.g., 50%) of the first portion or when moisture is not sensed, the moisture is considered to have been removed, and thus the electronic device 900 may complete rebooting. When moisture on the first portion is not completely removed in operation 1040, the electronic device may output a submersion guide requesting for a visit to a service center.

According to various embodiments, when introduction of moisture into the connector 910 is sensed, the electronic device 900 may switch the touch sensor IC 506 to a normal power mode in order to determine the amount of introduced moisture. Therefore, the touch sensor IC 506 is not required to always be turned on, and thus the current consumption by the display can be reduced.

Figure 11:
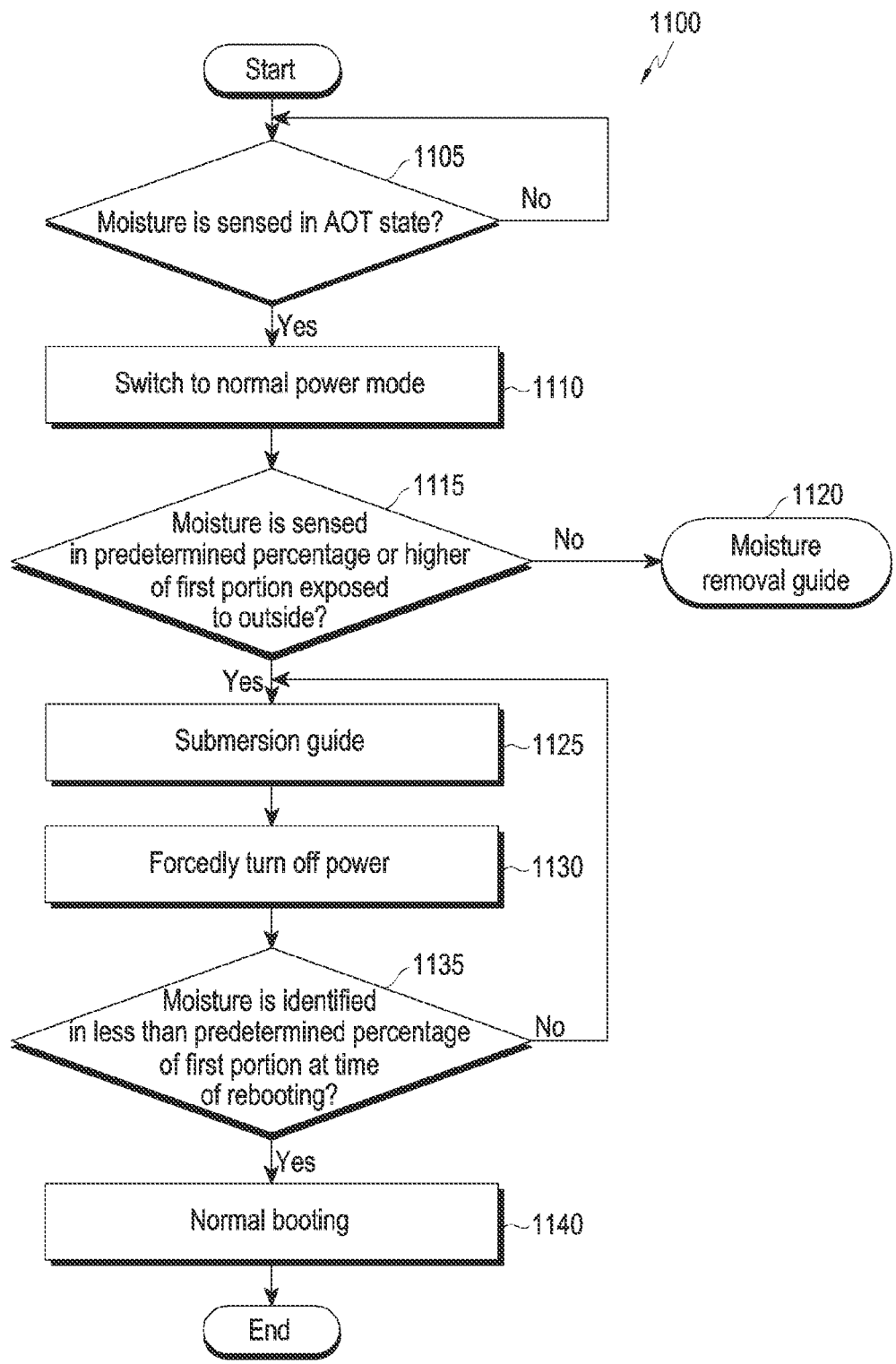
FIG. 11 is a flowchart of operations of an electronic device at the time of moisture sensing in an AOT state, according to an embodiment.

FIG. 11 is a flowchart 1100 of operations of an electronic device at the time of moisture sensing in an AOT state, according to an embodiment.

FIG. 11 illustrates operations in the electronic device 900 in the case of identifying a moisture-introduced state by activating the touch sensor panel 503 when moisture is sensed in a low-power mode such as an AOT state.

Referring to FIG. 11, in operation 1105, the electronic device 900 may determine sensing of moisture in an AOT state. For example, the electronic device 900 may sense moisture in at least a partial region in the AOT state in which a touch sensor IC (e.g., the touch sensor IC 560 in FIG. 5) operates in a low-power mode. In the AOT state, only a partial region of the flexible display 903 is activated to recognize a capacitance change caused by an external object, and thus, the electronic device 900 may sense moisture in the partial region.

If moisture is sensed in the partial region, the electronic device 900 may switch the touch sensor IC 506 to a normal power mode in operation 1110. Thus, when moisture is sensed in a low-power mode as in the AOT state, by switching the touch sensor IC 506 for sensing introduction of moisture to the flexible display 903 to a normal power mode, the electronic device 900 may determine, in operation 1115, whether moisture is sensed in a predetermined percentage (e.g., 50%) or higher of the first portion of the flexible display 903, exposed to the outside. If moisture is not sensed in the predetermined percentage (e.g., 50%) or higher of the first portion, the electronic device 900 may output, in operation 1120, a guide for moisture removal.

However, if moisture is sensed in the predetermined percentage (e.g., 50%) or higher of the first portion of the flexible display 903 exposed to the outside, the electronic device 900 may output a submersion guide regarding submersion in operation 1125, and, in operation 1130, may forcedly turn off power in order to prevent damage to the electronic device 900 due to submersion. Operations 1125 to 1140 may be the same as operations 1030 to 1045 in FIG. 10, and thus a detailed description thereof will be omitted.

Figure 12:
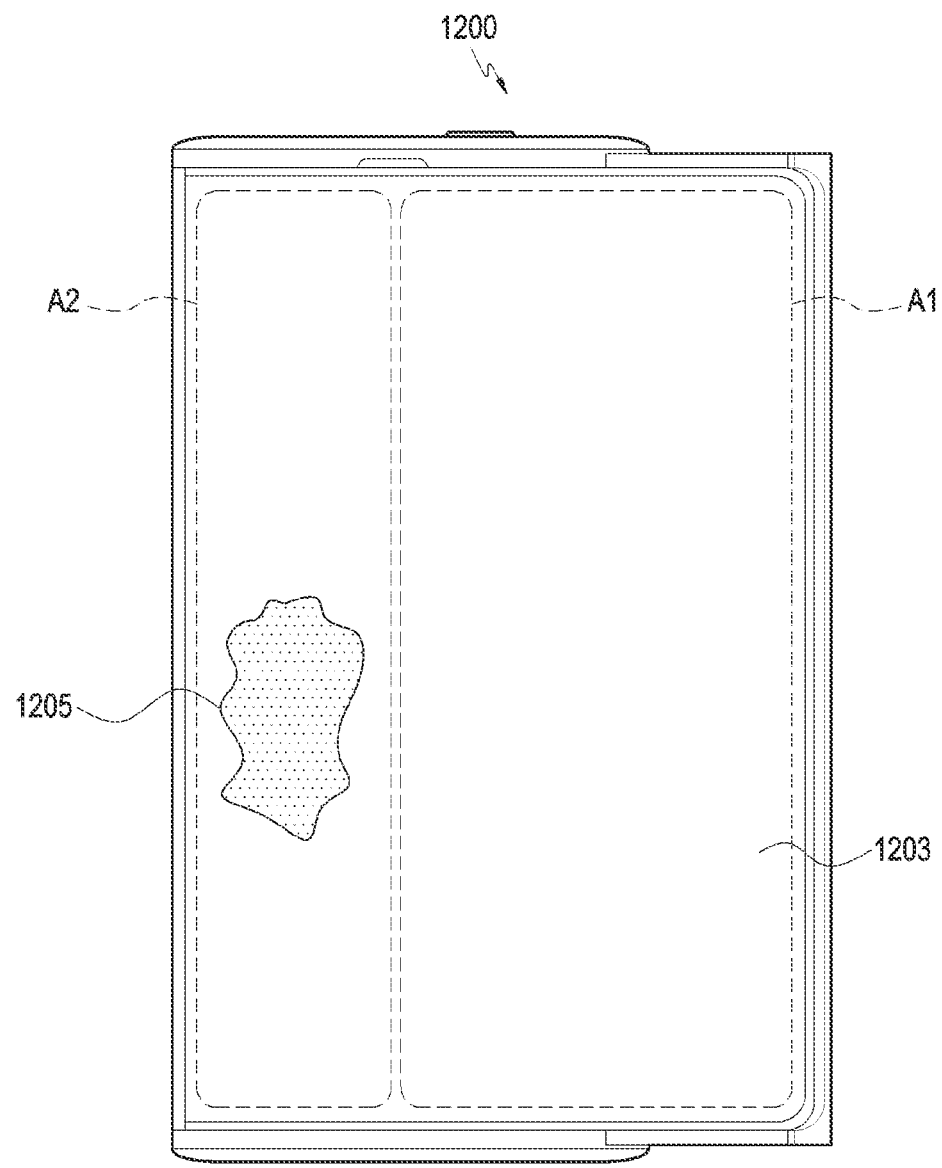
FIG. 12 is an illustration for describing moisture sensing in an opened state, according to an embodiment.

FIG. 12 illustrates moisture sensing in an opened state, according to an embodiment.

As illustrated in FIG. 12, when a first structure (e.g., the first structure 201 in FIG. 2A) of an electronic device 1200 moves from a closed state to an opened state, a second region A2 of a flexible display 1203 may substantially form a flat surface together with a first region (e.g., the first region A1 in FIG. 2A) while being gradually exposed out of a second structure (e.g., the second structure 202 in FIG. 2A). Thus, in a completely opened state or in an intermediate state between the closed state and the opened state, at least one portion of the flexible display 1203, for example, the second region A2, may be exposed to the front surface together with the first region A1. As illustrated in FIG. 12, when a sliding event for inserting the at least one portion of the flexible display 1203, including the second region A2, into the second structure (e.g., the second structure 202 in FIG. 2A) occurs in a state in which there is moisture 1205 in the second region (e.g., the second region A2 in FIG. 2B), the second region A2 may be received in the second structure 202, and thus the moisture is likely to be introduced into the second structure.

According to an embodiment, when the sliding event for inserting the at least one portion of the flexible display 1203 into the second structure 202 occurs, the electronic device 1200 may sense whether there is moisture on the at least one portion (e.g., the second region A2) exposed to the front surface. If moisture is sensed on the at least one portion (e.g., the second region A2), the sliding operation may be stopped by, for example, limiting an operation of a driving motor or ignoring processing of the sliding event. The above stopping of the sliding operation may prevent moisture from being introduced into the electronic device 1200.

In FIG. 12, a moisture sensing range in the completely opened state or in the intermediate state between the closed state and the opened state has been described by using the second region A2 as an example, but the moisture sensing range may be adjustable. According to an embodiment, in addition to the adjustment of the moisture sensing range, a moisture removal guide, stopping of a sliding operation, or an operation such as force power-off may be differently configured in response to a moisture-sensed position. For example, even when moisture is sensed in the second region A2, the electronic device 1200 may limit a sliding operation instead of displaying a simple moisture removal guide if a moisture-sensed position is adjacent to the second structure 202 within a predetermined distance, and may display a moisture removal guide when moisture is detected at a position (e.g., the first region A1) or farther apart from the second structure 202. According to an embodiment, the electronic device 1200 may perform an operation of responding to a moisture-introduced state, based on at least one moisture-introduced area and a moisture-sensed position.

Figure 13:
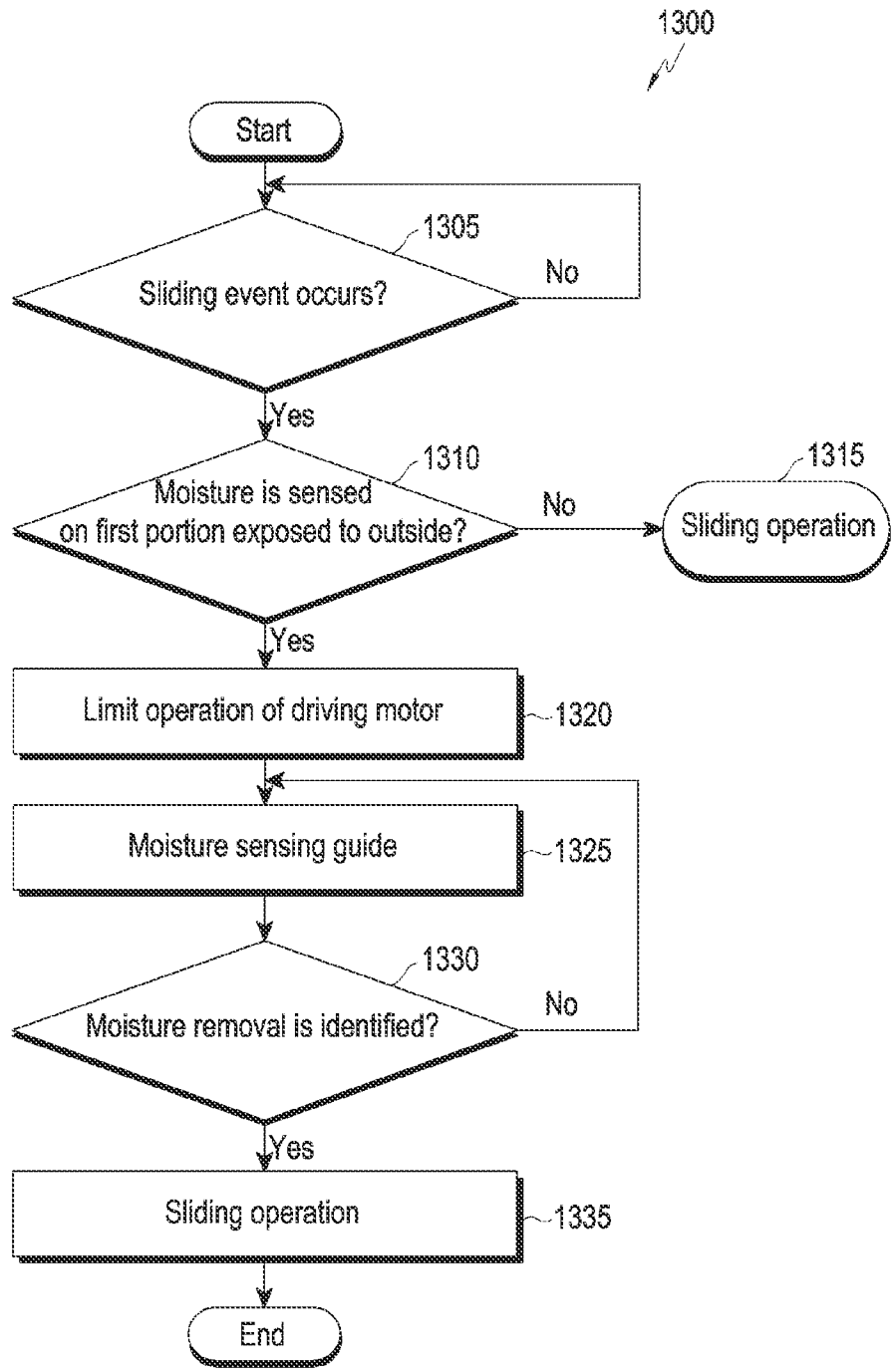
FIG. 13 is a flowchart of operations of an electronic device at the time of moisture sensing in an opened state, according to an embodiment.

FIG. 13 is a flowchart 1300 of operations of an electronic device at the time of moisture sensing in an opened state, according to an embodiment.

Referring to FIG. 13, when a sliding event (e.g., rolling-in) occurs in operation 1305, the electronic device 1200 may determine, in operation 1310, whether moisture is sensed on at least one portion (hereinafter, referred to as a "first portion") of the flexible display 1203, exposed to the outside (e.g., exposed to the front surface of the electronic device 1200). For example, as illustrated in FIG. 12, the electronic device 1200 may sense, based on data of the touch sensor panel 503, moisture in the second region A2 included in the at least one portion of the flexible display 1203. If moisture in the first portion is not sensed, a sliding operation (e.g., rolling-in) corresponding to the sliding event may be performed in operation 1315.

However, when moisture in the first portion exposed to the outside is sensed in operation 1310, the electronic device 1200 may limit an operation of a driving motor in operation 1320. For example, the electronic device 1200 may not drive an element such as the driving motor for an automatic sliding operation. Subsequently, in operation 1325, the electronic device 1200 may guide moisture sensing such that moisture can be removed. Subsequently, in operation 1330, the electronic device 1200 may determine whether the moisture has been removed. For example, after a predetermined time has elapsed since at a time point of limiting the operation of the driving motor, the electronic device 1200 may determine, through the touch sensor panel 503, whether the moisture has been removed. If the moisture has been removed, the electronic device 1200 may automatically perform, in operation 1335, a sliding operation by releasing the limiting of the operation of the driving motor. For example, after the moisture is removed, the electronic device 1200 may normally perform a rolling-in operation in response to the sliding event. As described above, the electronic device 1200 may perform, based on the moisture-sensed region (or the moisture-sensed position), an operation of responding to a moisture-introduced state.

Figure 14:
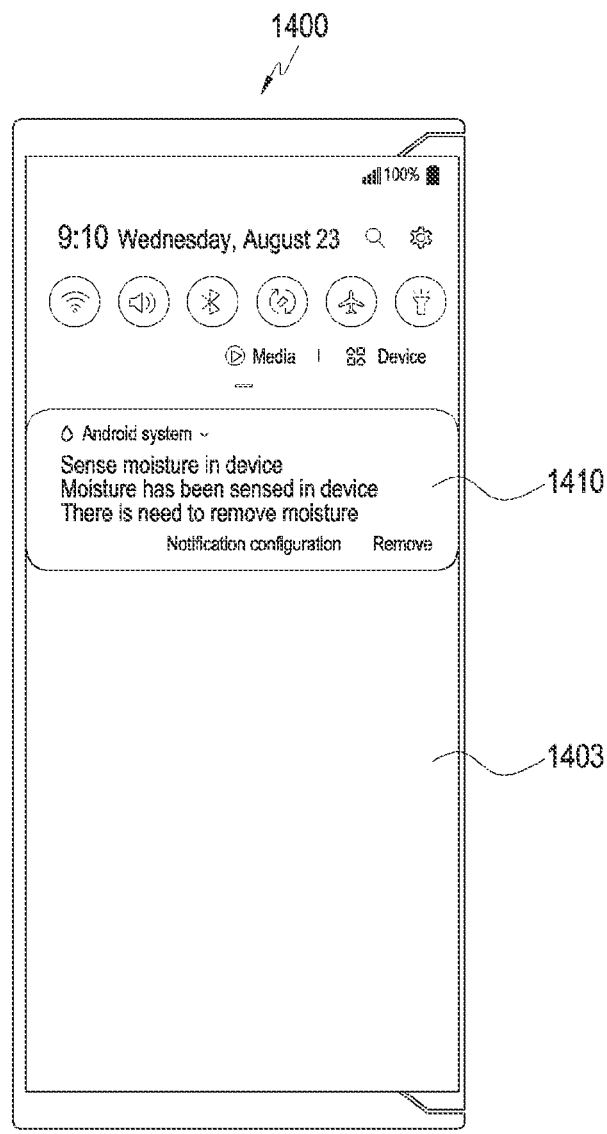
FIG. 14 illustrates a screen showing the result of moisture sensing, according to an embodiment.

FIG. 14 illustrates a screen showing the result of moisture sensing, according to an embodiment.

Referring to FIG. 14, an electronic device 1400 may provide a preconfigured notification in response to sensing of a moisture-introduced state. For example, the electronic device 1400 may display a warning message 1410 in order to indicate that a flexible display 1403 may be damaged due to introduction of moisture. According to an embodiment, when it is determined that there is moisture on at least one portion of the flexible display 1403, the electronic device 1400 may display information indicating that there is moisture on the flexible display 1403. For example, as illustrated in FIG. 14, the electronic device 1400 may display a content indicating that there is a need to remove moisture.

According to an embodiment, when the amount of moisture introduced on the at least one portion of the flexible display 1403 is equal to or more than a predetermined amount, the electronic device 1400 may display information indicating that power is forcedly turned off in order to prevent from the flexible display 1403 from being damaged. According to an embodiment, the electronic device 1400 may provide a preconfigured notification in order to indicate that the flexible display 1403 may be damaged due to moisture. For example, a moisture-introduced state may be notified through a haptic effect or a notification sound, and the type of notification may not be limited thereto.

In another example, after moisture existing on the flexible display 1403 has been removed, the electronic device 1400 may display information indicating that a sliding operation of the flexible display 1403 is possible.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
   a housing;
   a display including a touch sensor panel, wherein the display is configured to move with respect to the housing so that at least one portion of the display is exposed from an inside of the housing to a front surface of the electronic device or is inserted into the inside of the housing; and
   at least one processor operatively connected to the display,
   wherein the at least one processor is configured to:
   acquire, in a state in which the at least one portion of the display is exposed from the inside of the housing to the front surface of the electronic device, data indicating a capacitance change on the at least one portion of the display through the touch sensor panel,
   identify a moisture area on the at least one portion of the display, based on the acquired data, and
   in response to identifying the moisture area on the at least one portion of the display, perform an operation according to a size of the moisture area on the at least one portion of the display or a position of the moisture area on the at least one portion of the display in order to prevent the moisture from being introduced into the electronic device,
   wherein, if the size of the moisture area on the at least one portion of the display is larger than or equal to a threshold or the position of the moisture area on the at least one portion of the display is adjacent to a portion of the housing within a predetermined distance, the operation is for limiting the at least one portion of the display to be inserted into the housing, and
   wherein, if the size of the moisture area on the at least one portion of the display is less than the threshold or the position of the moisture area on the at least one portion of the display is farther apart from the portion of the housing than the predetermined distance, the operation is for displaying a notification indicating that the moisture should be removed through the display.

2. The electronic device of claim 1, wherein the display is configured to move through rolling or sliding with respect to the housing so that at least one portion of the display is exposed from the inside of the housing to the front surface of the electronic device.

3. The electronic device of claim 1, wherein the at least one processor is configured to stop a rolling or sliding operation which, in response to a case in which the size of the moisture area is larger than or equal to the predetermined area or the position of the moisture area is adjacent to the portion of the housing within the predetermined distance, causes the at least one portion of the display to be inserted into the housing.

4. The electronic device of claim 3, wherein the at least one processor is configured to:

identify the size of the moisture area or the position of the moisture area while the rolling or sliding operation is stopped, and
release the stopping of the rolling or sliding operation, in response to a case in which the size of the moisture area is smaller than the threshold or the position of the moisture area is farther apart from the portion of the housing than the predetermined distance.

5. The electronic device of claim 1, wherein the at least one processor is configured to turn off power of the electronic device based on the size of the moisture area being larger than or equal to the threshold.

6. The electronic device of claim 5, wherein the at least one processor is configured to:
   identify the size of the moisture area before rebooting, while the power of the electronic device is turned off, and
   complete the rebooting, based on the identified size of the moisture area being smaller than the threshold.

7. The electronic device of claim 1, wherein the at least one processor is configured to:
   sense moisture introduced into a connector, and
   based on the moisture introduced into the connector being sensed, identify the moisture-introduced state.

8. A method performed by an electronic device to sense introduction of moisture, the method comprising:
   acquiring, in a state in which at least one portion of a display of the electronic device is exposed from an inside of a housing of the electronic device to a front surface of the electronic device, data indicating a capacitance change on the at least one portion of the display through a touch sensor panel of the electronic device, wherein the display is configured to move with respect to the housing so that at least one portion of the display is exposed from the inside of the housing to the front surface of the electronic device or is inserted into the inside of the housing;
   identifying a moisture area on the at least one portion of the display, based on the acquired data; and
   in response to identifying the moisture area on the at least one portion of the display, performing an operation according to a size of the moisture area on the at least one portion of the display or a position of the moisture area on the at least one portion of the display in order to prevent the moisture from being introduced into the electronic device,
   wherein, if the size of the moisture area on the at least one portion of the display is larger than or equal to a threshold or the position of the moisture area on the at least one portion of the display is adjacent to a portion of the housing within a predetermined distance, the operation is for limiting the at least one portion of the display to be inserted into the housing, and
   wherein, if the size of the moisture area on the at least one portion of the display is less than the threshold or the position of the moisture area on the at least one portion of the display is farther apart from the portion of the housing than the predetermined distance, the operation is for displaying a notification indicating that the moisture should be removed through the display.

9. The method of claim 8, wherein the state in which the at least one portion of the display is exposed to the front surface of the electronic device includes a state in which the at least one portion of the display is exposed from the inside of the housing to the front surface of the electronic device by moving through rolling or sliding with respect to the housing.

10. The method of claim 8, wherein performing the operation comprises stopping a rolling or sliding operation which, in response to a case in which the size of the moisture area is larger than or equal to the predetermined area or the position of the moisture area is adjacent to the portion of the housing within the predetermined distance, causes the at least one portion of the display to be inserted into the housing of the electronic device.

11. The method of claim 8, further comprising:
  identifying the size of the moisture area or the position of the moisture area while the rolling or sliding operation is stopped; and
  releasing the stopping of the rolling or sliding operation based on the size of the moisture area being smaller than the threshold or the position of the moisture area being farther apart from the portion of the housing than the predetermined distance.

12. The method of claim 8, further comprising:
  turning off power of the electronic device based on the size of the moisture area being larger than or equal to the threshold.

13. The method of claim 8, further comprising:
  sensing moisture introduced into a connector; and
  identifying the moisture-introduced state when the moisture introduced into the connector is sensed.

* * * * *